US010047326B2

(12) United States Patent
Tani et al.

(10) Patent No.: US 10,047,326 B2
(45) Date of Patent: Aug. 14, 2018

(54) AZEOTROPIC LIKE COMPOSITION CONTAINING 2-CHLORO-1,3,3,3-TETRAFLUOROPROPENE AND 1-CHLORO-3,3,3-TRIFLUOROPROPENE

(71) Applicant: Central Glass Company, Limited, Yamaguchi (JP)

(72) Inventors: Masahiko Tani, Saitama (JP); Hideaki Imura, Saitama (JP); Yoshio Nishiguchi, Saitama (JP); Naoto Takada, Saitama (JP)

(73) Assignee: CENTRAL GLASS COMPANY, LIMITED, Yamaguchi (JP)

( * ) Notice: Subject to any disclaimer, the term of this patent is extended or adjusted under 35 U.S.C. 154(b) by 0 days.

(21) Appl. No.: 15/475,271

(22) Filed: Mar. 31, 2017

(65) Prior Publication Data
US 2017/0218311 A1 Aug. 3, 2017

Related U.S. Application Data

(63) Continuation of application No. PCT/JP2015/077607, filed on Sep. 29, 2015.

(30) Foreign Application Priority Data

Oct. 2, 2014 (JP) ................................ 2014-203687

(51) Int. Cl.
| | |
|---|---|
| C09K 5/04 | (2006.01) |
| C11D 7/30 | (2006.01) |
| C11D 7/50 | (2006.01) |
| C09K 3/00 | (2006.01) |
| B01F 17/00 | (2006.01) |
| C08J 9/14 | (2006.01) |

(52) U.S. Cl.
CPC ............ *C11D 7/30* (2013.01); *B01F 17/0035* (2013.01); *B01F 17/0085* (2013.01); *C08J 9/144* (2013.01); *C09K 3/00* (2013.01); *C09K 5/044* (2013.01); *C09K 5/048* (2013.01); *C11D 7/50* (2013.01); *C08J 2203/144* (2013.01); *C08J 2203/202* (2013.01); *C08J 2375/06* (2013.01); *C09K 2205/126* (2013.01); *C09K 2205/22* (2013.01); *C09K 2205/32* (2013.01)

(58) Field of Classification Search
CPC .... C09K 5/044; C09K 5/048; C09K 2205/32; C09K 2205/22; C09K 2205/126; C09K 3/00; C11D 7/30; C11D 7/50; B01F 17/0085; B01F 17/0035; C08J 9/144; C08J 2375/06; C08J 2203/144; C08J 2203/202
USPC ............. 252/67, 364; 510/177, 408; 62/529
See application file for complete search history.

(56) References Cited

U.S. PATENT DOCUMENTS

| | | | |
|---|---|---|---|
| 6,018,084 A | 1/2000 | Nakada et al. | |
| 2010/0152504 A1 | 6/2010 | Hulse et al. | |
| 2012/0128964 A1 | 5/2012 | Hulse et al. | |
| 2012/0172636 A1 | 7/2012 | Pokrovski et al. | |
| 2014/0005447 A1 | 1/2014 | Okamoto et al. | |
| 2014/0018582 A1* | 1/2014 | Sun | C07C 17/38 570/155 |
| 2015/0011805 A1 | 1/2015 | Okamoto et al. | |
| 2015/0259267 A1* | 9/2015 | Sun | C07C 17/389 570/155 |
| 2016/0023176 A1* | 1/2016 | Bonnet | C01B 7/191 51/307 |
| 2016/0023974 A1* | 1/2016 | Bonnet | C07C 21/18 252/182.12 |
| 2016/0052842 A1* | 2/2016 | Nappa | C07C 17/389 570/155 |
| 2017/0174965 A1* | 6/2017 | Tsuchiya | C09K 5/044 |

FOREIGN PATENT DOCUMENTS

| | | | | |
|---|---|---|---|---|
| EP | 3127985 A1 | 2/2017 | | |
| FR | 3003566 A1 * | 9/2014 | ............ | C07C 21/18 |
| JP | H9-183740 A | 7/1997 | | |
| JP | 2013-87066 A | 5/2013 | | |
| JP | 2013-103890 A | 5/2013 | | |
| JP | 2014-024821 A | 2/2014 | | |
| JP | 2014-028800 A | 2/2014 | | |
| JP | 2014-509310 A | 4/2014 | | |
| JP | 2015-196702 A | 11/2015 | | |
| WO | WO 2014147312 A1 * | 9/2014 | ............ | C01B 7/191 |

OTHER PUBLICATIONS

B. Zhang et al., Adsorptive removal of halo-olefinic impurities from 1,1,1,3,3-pentafluoropropane over ion-exchanged Y zeolites, Journal of Fluorine Chemistry, 131 (2010), 554-560.*
English Translation of the Written Opinion of the International Search Authority dated Apr. 4, 2017 for Written Opinion of the International Search Authority for PCT/JP2015/077607, which was originally dated Dec. 28, 2015, was previously submitted on Mar. 31, 2017.
International Search Report dated Dec. 28, 2015, for PCT Application No. PCT/JP2015/077607 was previously submitted on Mar. 31, 2017.

*Primary Examiner* — Douglas J McGinty
(74) *Attorney, Agent, or Firm* — Hauptman Ham, LLP

(57) ABSTRACT

An azeotropic-like composition containing 2-chloro-1,3,3, 3-tetrafluoropropene and 1-chloro-3,3,3-trifluoropropene is provided. The azeotropic-like composition according to the present invention is non-flammable, has little influence on the environment, and has substantially the same composition ratio in the liquid phase and the gas phase. By use of an azeotropic-like composition according to the present invention, a washing detergent, a solvent, a silicone solvent, a foaming agent, a coolant, a heating medium for a heat pump, and a high temperature working fluid that are non-flammable, have little influence on the environment, and have substantially the same composition ratio in a liquid phase and a gas phase thereof may be provided.

25 Claims, 11 Drawing Sheets

(56) References Cited

OTHER PUBLICATIONS

Written Opinion of the International Search Authority dated Dec. 28, 2015, for PCT Application No. PCT/JP2015/077607, was previously submitted on Mar. 31, 2017.
International Search Report dated Jul. 4, 2016 for PCT application No. PCT/JP2015/077607.
Written Opinion of the International Search Authority dated Jul. 4, 2016 for PCT application No. PCT/JP2015/077607.
Extended European Search Report dated May 2, 2018 for corresponding European Application No. EP 15848096.2.

* cited by examiner

AZEOTROPIC LIKE COMPOSITION CONTAINING 2-CHLORO-1,3,3,3-TETRAFLUOROPROPENE AND 1-CHLORO-3,3,3-TRIFLUOROPROPENE

CROSS REFERENCE TO RELATED APPLICATIONS

This application is based on and claims the benefit of priority from the prior Japanese Patent Application No. 2014-203687, filed on Oct. 2, 2014, and the prior PCT Application PCT/JP2015/077607, filed on Sep. 29, 2015, the entire contents of which are incorporated herein by reference.

FIELD

The present invention relates to an azeotropic-like composition containing 2-chloro-1,3,3,3-tetrafluoropropene (HCFO-1224xe) and 1-chloro-3,3,3-trifluoropropene (HCFO-1233zd), which is useful in many uses. This azeotropic-like composition is useful as a washing detergent, a solvent, a silicone solvent, a foaming agent, a coolant, a heating medium for a heat pump, a high-temperature working fluid or the like.

BACKGROUND

In order to stop global warming or the depletion of the ozone layer, various types of substitutes for chlorofluorocarbon have been proposed so far. Hydrofluorocarbons (HFCs), which do not contain chlorine as an element depleting ozone, have been in wide use in order to protect the ozone layer. However, HFCs generally have a long atmospheric life and has a significant influence on the global environment such as global warming and the like.

1-chloro-3,3,3-trifluoropropene (HCFO-1233zd) has geometric isomers, namely, a trans isomer (E isomer) and a cis isomer (Z isomer), which are respectively called "HCFO-1233zd (E)" and "HCFO-1233zd (Z)". In the case where it is not intended to distinguish whether the isomer is a trans isomer or a cis isomer, the isomer may be referred to as "HCFO-1233zd". A mixture of the trans isomer and the cis isomer may also be referred to as "HCFO-1233zd". HCFO-1233zd (E) having a boiling point of 19° C. is commercially produced as a next-generation foaming agent. HCFO-1233zd (Z) having a boiling point of 39° C. is now proposed to be used as a solvent or a washing detergent (Japanese Laid-Open Patent Publication No. 2013-103890).

Like HCFO-1233zd, 2-chloro-1,3,3,3-tetrafluoropentene (HCFO-1224xe) also has a trans isomer (E isomer) and a cis isomer (Z isomer), which are respectively referred to as HCFO-1224xe (E) and HCFO-1224xe (Z). In the case where it is not intended to distinguish whether the isomer is a trans isomer or a cis isomer, the isomer may be referred to as "HCFO-1223xe". A mixture of the trans isomer and the cis isomer may also be referred to as "HCFO-1223xe". There are not many documents on HCFO-1223xe. There are not many examples of isolating the trans isomer (E isomer) or the cis isomer (Z isomer), and properties thereof including the boiling point and the like have not been much discussed.

Regarding chlorofluorocarbon and the substitutes for chlorofluorocarbon (hereinafter, referred to as "chlorofluorocarbons"), mixed coolants containing two or more of various chlorofluorocarbons in a mixture have been proposed so far. For example, coolant Nos. R502, R507A, R404A, R407C, R410A and the like of American Society of Heating, Refrigerating and Air-Conditioning Engineers (ASHRAE) are famous as mixed coolants. These mixed coolants each contain two or more of chlorofluorocarbons mixed at a specific ratio to have a higher coefficient of performance, a higher refrigeration cycle, a higher non-flammability, a lower global warming potential, and the like.

However, the chlorofluorocarbons are volatile. Therefore, if one of the chlorofluorocarbons in such a mixture is evaporated more than the other chlorofluorocarbon(s), the composition ratio of the mixture is changed and thus the properties thereof are changed before the mixture is used. For this reason, it is preferable that the mixture is an azeotropic or azeotropic-like composition, which is volatilized with substantially the same composition ratio as that of a liquid phase. For example, R502 (mixed coolant of R22 and R115) and R507A (mixed coolant of R143a and R125) are each an azeotropic composition, which has exactly the same composition ratio in a gas phase and a liquid phase thereof. These coolants are used as azeotropic coolants. Regarding R410A, the components thereof, namely, R32 and R125, are not azeotropic, but R410A have substantially the same composition ratio in a gas phase and a liquid phase thereof. Therefore, R410A is widely used as an azeotropic-like coolant.

With the current state of the art, it is difficult to find such an azeotropic composition or an azeotropic-like composition theoretically on paper, and needs to be confirmed only by an actual experiment.

SUMMARY

The present invention has an object of providing a fluorine-containing olefin-based azeotropic-like composition having little influence on global warming or the like.

As a result of active studies, the present inventors have found that a combination of a specific isomer of 2-chloro-1,3,3,3-tetrafluoropropene (HCFO-1224xe) and a specific isomer of 1-chloro-3,3,3-trifluoropropene (HCFO-1233zd) is an azeotropic-like composition having substantially the same composition ratio in a gas phase and a liquid phase thereof. The present inventors have found that more specifically, an azeotropic-like composition containing 2-chloro-1,3,3,3-tetrafluoropropene (HCFO-1224xe) and 1-chloro-3,3,3-trifluoropropene (HCFO-1233zd) is useful as a washing detergent, a solvent, a silicone solvent, a foaming agent, a coolant, a heating medium for a heat pump, a high-temperature working fluid or the like and have completed the present invention.

Specifically, the present invention is as follows.

Invention 1

An azeotropic-like composition containing 2-chloro-1,3,3,3-tetrafluoropropene (HCFO-1224xe) and 1-chloro-3,3,3-trifluoropropene (HCFO-1233zd).

Invention 2

An azeotropic-like composition containing trans-2-chloro-1,3,3,3-tetrafluoropropene (HCFO-1224xe (E)) and trans-1-chloro-3,3,3-trifluoropropene (HCFO-1233zd (E)).

Invention 3

An azeotropic-like composition containing trans-1-chloro-3,3,3-trifluoropropene (HCFO-1233zd (E)) at a content of 1 mol % or greater and 99.999 mol % or less, and containing trans-2-chloro-1,3,3,3-tetrafluoropropene (HCFO-1224xe (E)) at a content of 0.001 mol % or greater and 99 mol % or less.

Invention 4

An azeotropic-like composition containing cis-2-chloro-1,3,3,3-tetrafluoropropene (HCFO-1224xe (Z)) and trans-1-chloro-3,3,3-trifluoropropene (HCFO-1233zd (E)).

Invention 5

An azeotropic-like composition containing cis-2-chloro-1,3,3,3-tetrafluoropropene (HCFO-1224xe (Z)) at a content of 0.001 mol % or greater and 99.999 mol % or less, and containing trans-1-chloro-3,3,3-trifluoropropene (HCFO-1233zd (E)) at a content of 0.001 mol % or greater and 99.999 mol % or less.

Invention 6

An azeotropic-like composition containing trans-2-chloro-1,3,3,3-tetrafluoropropene (HCFO-1224xe (E)) and cis-1-chloro-3,3,3-trifluoropropene (HCFO-1233zd (Z)).

Invention 7

An azeotropic-like composition containing trans-2-chloro-1,3,3,3-tetrafluoropropene (HCFO-1224xe (E)) at a content of 90 mol % or greater and 99.9 mol % or less, and containing cis-1-chloro-3,3,3-trifluoropropene (HCFO-1233zd (Z)) at a content of 0.1 mol % or greater and 10 mol % or less.

Invention 8

An azeotropic-like composition containing trans-2-chloro-1,3,3,3-tetrafluoropropene (HCFO-1224xe (E)), cis-2-chloro-1,3,3,3-tetrafluoropropene (HCFO-1224xe (Z)) and trans-1-chloro-3,3,3-trifluoropropene (HCFO-1233zd (E)).

Invention 9

An azeotropic-like composition containing trans-2-chloro-1,3,3,3-tetrafluoropropene (HCFO-1224xe (E)), cis-2-chloro-1,3,3,3-tetrafluoropropene (HCFO-1224xe (Z)), trans-1-chloro-3,3,3-trifluoropropene (HCFO-1233zd (E)), and cis-1-chloro-3,3,3-trifluoropropene (HCFO-1233zd (Z)).

Invention 10

A washing detergent, comprising the azeotropic-like composition according to any one of inventions 1 through 9.

Invention 11

A solvent, comprising the azeotropic-like composition according to any one of inventions 1 through 9.

Invention 12

A silicone solvent, comprising the azeotropic-like composition according to any one of inventions 1 through 9.

Invention 13

A foaming agent, comprising the azeotropic-like composition according to any one of inventions 1 through 9.

Invention 14

A heat transfer medium, comprising the azeotropic-like composition according to any one of inventions 1 through 9.

Invention 15

A heat transfer device using the heat transfer medium according to invention 14.
An organic rankine cycle system using the heat transfer medium according to invention 14.
A high temperature heat pump cycle system using the heat transfer medium according to invention 14.
A refrigeration cycle system using the heat transfer medium according to invention 14.

An azeotropic-like composition according to the present invention is non-flammable, has little influence on the environment, and has substantially the same composition ratio in a liquid phase and a gas phase thereof. By use of an azeotropic-like composition according to the present invention, a washing detergent, a solvent, a silicone solvent, a foaming agent, a coolant, a heating medium for a heat pump, and a high temperature working fluid that are non-flammable, have little influence on the environment, and have substantially the same composition ratio in a liquid phase and a gas phase thereof may be provided.

DESCRIPTION OF EMBODIMENTS

Figure 1:
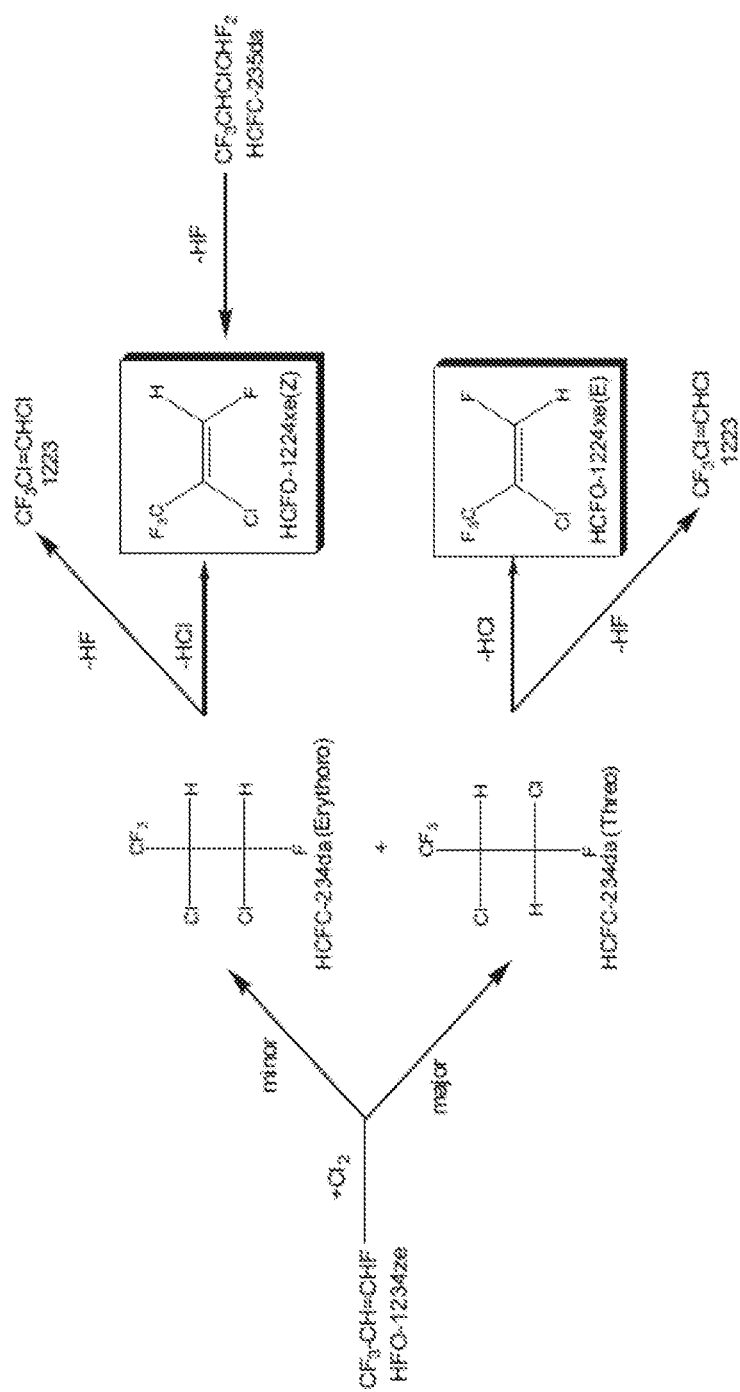
FIG. 1 shows a process for producing 2-chloro-1,3,3,3-tetrafluoropropene (HCFO-1224xe) from a fluorine-containing olefin.

Hereinafter, an azeotropic mixture-like composition, a heat transfer composition, a washing detergent, a solvent and a foaming agent according to the present invention will be described with reference to the drawings. The azeotropic mixture-like composition, a heat transfer composition, the washing detergent, a solvent and a foaming agent and a method for forming according to the present invention should not be construed as being limited to any of the following embodiments or examples. In the drawings referred to in the embodiments and the examples, elements same as, or having substantially the same functions to, the element described before will be represented by the same reference signs, and will not be described in repetition.

An azeotropic-like composition according to the present invention is a mixture of 2-chloro-1,3,3,3-tetrafluoropropene (HCFO-1224xe) and 1-chloro-3,3,3-trifluoropropene (HCFO-1233zd). The present inventors have found the following. Because of being such a mixture, the azeotropic-like composition according to the present invention is non-flammable. In addition, compounds contained in the composition include a double bond in a molecule thereof. Therefore, even if the azeotropic-like composition is released into the air, the double bond and an OH radical in the air react with each other and thus the azeotropic-like composition is decomposed quickly. Therefore, the azeotropic-like composition has little influence on the environment, and is usable, as a substitute for CFC, HCFC or the like, for a washing detergent, a solvent, a silicone solvent, a foaming agent, a coolant, a heating medium for a heat pump, a high-temperature working fluid or the like.

<Azeotropic-Like Composition>

An azeotropic composition has features that a liquid composition thereof has a fixed boiling point at a predetermined pressure and that the composition ratio of the steam of the liquid composition that is being boiled (composition ratio of the gas phase) is the same as the composition ratio of the liquid composition that is being boiled (composition ratio of the liquid phase). Namely, in the azeotropic composition, components of the liquid composition are not fractionated while the liquid composition is boiled. By contrast, an azeotropic-like composition is a composition behaving like an azeotropic composition. The liquid composition of the azeotropic-like composition has a substantially fixed boiling point at a predetermined pressure. When the liquid composition is volatilized, the composition ratio of the volatilized component is substantially the same as that of the liquid composition. Therefore, the composition ratio of the steam of the liquid composition that is being boiled (composition ratio of the gas phase) is merely changed at a negligible degree with respect to the composition ratio of the liquid composition that is being boiled (composition ratio of the liquid phase). Namely, in the azeotropic-like composition, components of the liquid composition are not fractionated easily while the liquid composition is boiled. For example, as described above, R410A (mixed coolant of R32 and R125) is non-azeotropic, but has substantially the same composition ratio in a gas phase and in a liquid phase thereof. Therefore, R410A is widely used as an azeotropic-like coolant. As a substitute for chlorofluorocarbon, an azeotropic composition and an azeotropic-like composition may be treated in the same manner practically. In this specification, it is often not practically necessary to strictly distinguish an azeotropic composition and an azeotropic-like composition as a substitute for chlorofluorocarbon. Therefore, "azeotropic" and "azeotropic-like" will be both referred to as "azeotropic-like", and an "azeotropic composition" and an "azeotropic-like composition" will be both referred to as an "azeotropic-like composition". By contrast, a non-azeotropic composition that is not azeotropic has a feature that the composition ratio of a gas phase thereof is made different from the composition ratio of a liquid phase thereof during evaporation or condensation.

<Method for Production>

There is no specific limitation on the method for producing 2-chloro-1,3,3,3-tetrafluoropropene (HCFO-1224xe) and 1-chloro-3,3,3-trifluoropropene (HCFO-1233zd). HCFO-1224xe may be produced from a fluorine-containing olefin industrially produced.

FIG. 1 shows a process for producing 2-chloro-1,3,3,3-tetrafluoropropene (HCFO-1224xe) from a fluorine-containing olefin. With reference to FIG. 1, the process for producing 2-chloro-1,3,3,3-tetrafluoropropene (HCFO-1224xe) will be described.

2-chloro-1,3,3,3-tetrafluoropropene (HCFO-1224xe) may be produced by chlorinating and then dehydrochlorinating commercially available 1,3,3,3-tetrafluoropropene (HFO-1234ze) (hereinafter, a trans isomer and a cis isomer of 1,3,3,3-tetrafluoropropene may be respectively referred to as "HFO-1234ze (E)" and "HFO-1234ze (Z)"; in the case where it is not intended to distinguish whether the isomer is a trans isomer or a cis isomer, the isomer may be referred to as "HFO-1234ze", and a mixture of the trans isomer and the cis isomer may also be referred to as "HFO-1234ze"). Either a trans isomer or a cis isomer of HFO-1234ze, which is a starting material, is usable, and therefore, HFO-1234ze (E), HFO-1234ze (Z) or a mixture thereof is usable. HFO-1234ze is reacted with chlorine while being irradiated with light, and as a result, 2,3-dichloro-1,1,1,3-tetrafluoropropane (hereinafter, may be referred to as "HCFC-234da") is generated. Next, HCFC-234da and a basic aqueous solution such as an aqueous solution of potassium hydroxide or the like are put into contact with each other, and as a result, HCFO-1224xe is generated. HCFO-1224xe is precision-distilled in a distillation column having a great number of stages, and as a result, the HCFO-1224xe (Z) and HCFO- 1224xe (E) are isolated. It is preferable to use a phase-transfer catalyst when the HCFC-234da and a basic aqueous solution are put into contact with each other because the use of the phase-transfer catalyst suppresses 1,2-dichloro-3,3,3-trifluoropropene (HCFC-1223xd) from being produced as a by-product.

2,3-dichloro-1,1,1,3-tetrafluoropropane (HCFC-234da) contains an erythro diastereomer and a threo diastereomer, which may be separated by distillation. When an erythro diastereomer of HCFC-234da and a basic aqueous solution such as an aqueous solution of potassium hydroxide or the like are put into contact with each other, HCFO-1224xe (Z) is generated as a main component. When a threo diastereomer of HCFC-234da and a basic aqueous solution such as an aqueous solution of potassium hydroxide or the like are put into contact with each other, HCFO-1224xe (E) is generated. It is not easy to separate HCFO-1224xe (E) and HCFO-1224xe (Z) by precision distillation. Therefore, diastereomers of HCFC-234da are once isolated and an erythro diastereomer and a threo diastereomer of HCFC-234da are used as starting materials, so that highly pure HCFO-1224xe (E) and highly pure HCFO-1224xe (Z) are produced. Thus, once separating, an erythro diastereomer and a threo diastereomer of HCFC-234da from each other by distillation and then dehydrochlorinating the erythro diastereomer and the threo diastereomer of HCFC-234da is one of preferable embodiments for producing highly pure HCFO-1224xe (E) and/or highly pure HCFO-1224xe (Z).

Alternatively, 2-chloro-1,1,1,3,3-pentafluoropropane (hereinafter, may be referred to as "HCFC-235da") and a basic aqueous solution such as an aqueous solution of potassium hydroxide or the like may be put into contact with each other, so that HCFO-1224xe (Z) is produced. HCFC-235da may be obtained as a by-product during the production of HCFO-1233zd.

1-chloro-3,3,3-trifluoropropene (HCFO-1233zd) may be obtained as a commercially available product or may be produced. A person of ordinary skill in the art would learn a method for producing HCFO-1233zd by referring to the technological common knowledge at the time of the filing of this application. For example, trans-1-chloro-3,3,3-trifluoropropene (HCFO-1233zd (E)) may be produced by use of 1,1,1,3,3-pentachloropropane (HCC-240fa) and anhydrous hydrogen fluoride based on the description of Japanese Laid-Open Patent Publication No. H9-183740. Cis-1-chloro-3,3,3-trifluoropropene (HCFO-1233zd (Z)) may be produced by isomerizing HCFO-1233zd (E) based on the description of United States Patent Application Publication No. 2010/152504.

2-chloro-1,3,3,3-tetrafluoropropene (HCFO-1224xe) and 1-chloro-3,3,3-trifluoropropene (HCFO-1233zd), which are contained as materials of an azeotropic-like composition according to the present invention may be highly pure or may contain impurities inevitably incorporated at the time of production or recycling. In the case where a highly pure azeotropic-like composition is required because of the use thereof, it is desirable to use highly pure HCFO-1224xe and highly pure HCFO-1233zd. Otherwise, a general-purpose product or a recycled product may be used.

<Azeotropic-Like Composition Ratio>

As described above, it is difficult with the current state of the art to theoretically calculate an azeotropic or azeotropic-like composition ratio. Therefore, the present inventors found the following azeotropic-like composition ratio, after trials and errors, by mixing isomers of 2-chloro-1,3,3,3-tetrafluoropropene (HCFO-1224xe) (E isomer and Z isomer) and trans-1-chloro-3,3,3-trifluoropropene (HCFO-1233zd).

[Combination of HCFO-1224xe (E) and HCFO-1233zd (E)]

In an embodiment according to the present invention, an azeotropic-like composition contains 2-chloro-1,3,3,3-tetrafluoropropene (HCFO-1224xe) and 1-chloro-3,3,3-trifluoropropene (HCFO-1233zd). It is preferable that HCFO-1224xe is a trans isomer (HCFO-1224xe (E)) and that HCFO-1233zd is also a trans isomer (HCFO-1233zd (E)). A reason for this is that the azeotropic-like composition in an embodiment according to the present invention, when containing at least both of HCFO-1224xe (E) and HCFO-1233zd (E), has substantially the same optional composition ratio in a gas phase and a liquid phase thereof and is usable at a ratio desired by a person of ordinary skill in the art. A preferable azeotropic-like composition in an embodiment according to the present invention contains HCFO-1224xe (E) at a content of 0.001 mol % or greater and 99 mol % or less and HCFO-1233zd (E) at a content of 1 mol % or greater and 99.999 mol % or less. The azeotropic-like composition contains HCFO-1224xe (E) at a content of 80 mol % or greater and 99 mol % or less and HCFO-1233zd (E) at a content of 1 mol % or greater and 20 mol % or less, and the azeotropic-like composition contains HCFO-1224xe (E) at a content of 0.001 mol % or greater and 40 mol % or less and HCFO-1233zd (E) at a content of 60 mol % or greater and 99.999 mol % or less, have composition ratios close to each other in a gas phase and in a liquid phase thereof, which is especially preferable.

[Combination of HCFO-1224xe (Z) and HCFO-1233zd (E)]

In another embodiment according to the present invention, an azeotropic-like composition contains 2-chloro-1,3,3,3-tetrafluoropropene (HCFO-1224xe) and 1-chloro-3,3,3-trifluoropropene (HCFO-1233zd). It is preferable that HCFO-1224xe is a cis isomer (HCFO-1224xe (Z)) and that HCFO-1233zd is a trans isomer (HCFO-1233zd (E)). A reason for this is that the azeotropic-like composition in this embodiment according to the present invention, when containing at least both of HCFO-1224xe (Z) and HCFO-1233zd (E), has substantially the same composition ratio in a gas phase and a liquid phase thereof, regardless of the composition ratio between HCFO-1224xe (Z) and HCFO-1233zd (E). A preferable azeotropic-like composition in this embodiment according to the present invention contains HCFO-1224xe (Z) at a content of 0.001 mol % or greater and 99.999 mol % or less and HCFO-1233zd (E) at a content of 0.001 mol % or greater and 99.999 mol % or less.

[Combination of HCFO-1224xe (E), HCFO-1224xe (Z) and HCFO-1233zd (E)]

In still another embodiment according to the present invention, an azeotropic-like composition contains 2-chloro-1,3,3,3-tetrafluoropropene (HCFO-1224xe) and 1-chloro-3,3,3-trifluoropropene (HCFO-1233zd). It is preferable that HCFO-1224xe contains a trans isomer (HCFO-1224xe (E)) and a cis isomer (HCFO-1224xe (Z)) and that HCFO-1233zd is a trans isomer (HCFO-1233zd (E)). A reason for this is that the composition containing at least the three components of HCFO-1224xe (E), HCFO-1224xe (Z) and HCFO-1233zd (E) is azeotropic-like at any composition ratio. A preferable azeotropic-like composition in this embodiment according to the present invention contains HCFO-1233zd (E) at a content of 60 mol % or greater and 99.999 mol % or less and HCFO-1224xe at a content of 0.001 mol % or greater and 40 mol % or less. The ratios between HCFO-1224xe (E) and HCFO-1224xe (Z) is optional, but a molar ratio of HCFO-1224xe (E)/HCFO-1224xe (Z) is preferably 0.0001 or greater and 9999.9 or less. In general, in the case where HCFC-234da is synthesized by incorporating chlorine into HFO-1234ze, the ratio of threo diastereomer/erythro diastereomer of HCFC-234da is about 2:1. In the case where HCFC-234da is put into contact with a basic aqueous solution without separating the threo diastereomer and the erythro diastereomer from each other, the ratio of HCFC-1224xe (E)/HCFO-1224xe (Z) is about 2:1. Therefore, HCFO-1224xe having such a ratio may be used for the azeotropic-like composition in this embodiment according to the present invention. A reason for this is that it is not easy to separate HCFO-1224xe (E) and HCFO-1224xe (Z) from each other by precision distillation.

[Combination of HCFO-1224xe (E) and HCFO-1233zd (Z)]

In still another embodiment according to the present invention, an azeotropic-like composition contains 2-chloro-1,3,3,3-tetrafluoropropene (HCFO-1224xe) and 1-chloro-3,3,3-trifluoropropene (HCFO-1233zd). It is preferable that HCFO-1224xe is a trans isomer (HCFO-1224xe (E)) and that HCFO-1233zd is a cis isomer (HCFO-1233zd (Z)). A reason for this is that the azeotropic-like composition in this embodiment according to the present invention, when containing at least both of HCFO-1224xe (E) and HCFO-1233zd (Z), has substantially the same optional composition ratio in a gas phase and a liquid phase thereof. A preferable azeotropic-like composition in this embodiment according to the present invention contains HCFO-1224xe (E) at a content of 90 mol % or greater and 99.9 mol % or less and HCFO-1233zd (Z) at a content of 0.1 mol % or greater and 10 mol % or less.

The present inventors have found that a composition formed of only cis-2-chloro-1,3,3,3-tetrafluoropropene (HCFO-1224xe (Z)) and cis-1-chloro-3,3,3-trifluoropropene (HCFO-1233zd (Z)) is not an azeotropic-like composition. In a combination of HCFO-1224xe (Z) and HCFO-1233zd (Z), HCFO-1224xe (Z) is volatilized with priority in use, and as a result, HCFO-1233zd (Z) tends to be concentrated in a liquid phase. However, use of this composition, which is not an azeotropic-like composition, is not prohibited when the use thereof is desired by a person of ordinary skill in the art.

<Safety>

The azeotropic-like compositions described above according to the present invention are all non-flammable up to the boiling point and is a non-hazardous material defined by the Fire Services Act.

<Use as a Washing Detergent>

An azeotropic-like composition according to the present invention as described above has a superb washing capability. There is no specific limitation on the field of washing in which an azeotropic-like composition according to the present invention is used. The azeotropic-like composition is preferably usable in the fields in which CFC-113 (chlorotrifluoromethane), HCFC-141b (1,1-dichloro-1-fluoroethane), HCFC-225 (mixture of 3,3-dichloro-1,1,1,2,2-pentafluoropropane (HCFC-225ca) and 1,3-dichloro-1,1,2,2,3-pentafluoropropane (HCFC-225cb)) are conventionally used as a washing detergent. Specifically, the azeotropic-like composition is usable for washing electronic components (printed circuit boards, liquid crystal display tools, magnetic storage components, semiconductor materials, etc.), electric components, precision machine components, resin processing components, optical lenses, clothing, and the like. There is no limitation on the type of stain or dirt for which the azeotropic-like composition is used. The stain or dirt that is removable with CFC-113, HCFC-141b or HCFC-225 is removable with an azeotropic-like composition according to the present invention having an optimal composition ratio. Examples of such stain or dirt includes particles, oil, grease, wax, flux, ink, and the like.

There is no specific limitation on the method of washing. Any conventionally used method is usable. Specific examples of such a method include immersion, spraying, boiling, ultrasonic washing, steam washing, a combination of any thereof, and the like. Among these, a method of using immersion to remove the stain or dirt as described in the examples below is especially preferable. Herein, the term "immersion" refers to putting a target having stain such as oil or the like (washing target) into contact with an azeotropic-like composition according to the present invention. The washing target is immersed in the azeotropic-like composition according to the present invention, so that the stain attached to the washing target is dissolved in the azeotropic-like composition. Thus, the stain is removed from the washing target. The immersion operation may be combined with another washing operation (boiling, ultrasonic washing, etc.).

In an azeotropic-like composition according to the present invention, the liquid phase and the gas phase have substantially the same composition ratio as each other in a liquid-gas equilibrium state. Therefore, even if volatilization occurs along with time, the composition ratio changes very little, and thus a stable washing capability is maintained. A composition ratio change in a storage container during storage is also avoided.

In order to further improve the washing capability, the surfactant action or the like, any of various surfactants may be incorporated into a washing detergent containing an azeotropic-like composition according to the present invention when necessary. Examples of the usable surfactant include the following nonion-based surfactants: sorbitan fatty esters including sorbitanmonooleate, sorbitantrioleate, and the like; polyoxyethylene sorbit fatty acid esters including sorbit tetraoleate of polyoxyethylene, and the like; polyethyleneglycol fatty acid esters including polyoxyethylenemonolaurate, and the like; polyoxyethylenealkylethers including polyoxyethylenelaurylether, and the like; polyoxyethylenealkylphenylethers including polyoxyethylenenonylphenylether, and the like; polyoxyethylenealkylamine fatty acid amides including amide polyoxyethyleneoleate, and the like; etc. These surfactants may be used independently or as a combination of two or more thereof. In order to synergistically improve the washing capability and the surfactant action, a cation-based surfactant or an anion-based surfactant, in addition to the nonion-based surfactant, may be incorporated into a washing detergent containing an azeotropic-like composition according to the present invention. The amount of the surfactant, which depends on the type thereof, may be an amount that does not substantially influence the properties of the azeotropic-like composition. The amount of the surfactant is usually about 0.1% by mass or greater and about 20% by mass or less, and preferably about 0.3% by mass or greater and about 5% by mass or less, with respect to the azeotropic-like composition.

For use under severe conditions, any of various stabilizers may be incorporated into a washing detergent containing an azeotropic-like composition according to the present invention. There is no specific limitation on the type of the stabilizer. A desirable stabilizer is removed from together with the azeotropic-like composition when being distilled, or forms an azeotropic-like mixture together with the azeotropic-like composition. Specific examples of such a stabilizer include aliphatic nitro compounds including nitromethane, nitroethane, nitropropane, and the like; aromatic nitro compounds including nitrobenzene, nitrotoluene, nitrostyrene, nitroaniline, and the like; ethers including dimethoxymethane, 1,2-dimethoxyethane, 1,4-dioxane, 1,3,5-trioxane, tetrahydrofuran, and the like; epoxides including glycidol, methylglycidylether, allylglycidylether, 1,2-butyleneoxide, phenylglycidylether, cyclohexeneoxide, epichlorohydrin, and the like; unsaturated hydrocarbons including hexene, heptene, pentadiene, cyclopentene, cyclohexene, and the like; olefin-based alcohols including allylalcol, 1-butene-3-ol, and the like; acetylene-based alcohols including 3-methyl-1-butyne-3-ol, 3-methyl-1-pentyne-3-ol, and the like; and acrylic esters including methyl acrylate, ethyl acrylate, butyl acrylate, vinyl methacrylate, and the like. In order to provide a further stabilizing effect synergistically, a phenol, an amine or a benzotriazole may be further incorporated. These stabilizers may be used independently or as a combination of two or more thereof. The amount of the stabilizer, which depends on the type thereof, may be an amount that does not substantially influence the properties of the azeotropic-like composition. The amount of the stabilizer is usually about 0.01% by mass or greater and about 10% by mass or less, and preferably about 0.1% by mass or greater and about 5% by mass or less, with respect to the azeotropic-like composition.

<Use as a Foaming Agent>

Use of an azeotropic-like composition according to the present invention as a foaming agent will be described in detail.

Currently, trans-1-chloro-3,3,3-trifluoropropene (HCFO-1233zd (E) (molecular weight: 130.5)) is commercially produced as a foaming agent. A formulation optimized for HCFO-1233zd (E) is proposed. In the case where 2-chloro-1,3,3,3-tetrafluoropropene (HCFO-1224xe (molecular weight: 148.5)) is incorporated into the formulation, the heat insulating property of a hard urethane foam is improved with no significant change in the formulation.

An azeotropic-like composition according to the present invention containing 2-chloro-1,3,3,3-tetrafluoropropene (HCFO-1224xe) and 1-chloro-3,3,3-trifluoropropene (HCFO-1233zd) is usable as a foaming agent used to produce a hard urethane foam or a polyisocyanurate foam. For producing a hard urethane foam or a polyisocyanurate foam, a premix is necessary. The "premix" is a mixture of a foaming agent, at least one type of polyol, a catalyst, a foam stabilizer, a flame retardant, water and the like. The azeotropic-like composition according to the present invention may be used as a foaming agent in the premix and may be reacted with isocyanate, so that a hard urethane foam or a polyisocyanurate foam as a target product is produced. A substance containing an azeotropic-like composition according to the present invention and the above-described substance incorporated thereto is encompassed in the scope of the present invention.

Isocyanate includes aromatic isocyanate, cyclic aliphatic isocyanate, chain aliphatic isocyanate or the like. In general, two-functional isocyanate is used. Examples of such isocyanate include polyisocyanates including tolylenediisocyanate, diphenylmethanediisocyanate, polymethylenepolyphenylpolyisocyanate, tolylenediisocyanate, naphthalenediisocyanate, hexamethylenediisocyanate, isophoronediisocyanate, xylylenediisocyanate, hydrogenated xylylenediisocyanate, dicyclohexylmethaneisocyanate, and the like; prepolymer-type modified thereof; nurate modified thereof; and urea-modified thereof. These isocyanates may be used independently or as a mixture of any thereof.

Examples of the polyol that may be contained in the premix include polyether-based polyol, polyester-based polyol, polyhydric alcohol, hydroxy group-containing diethylene-based polymer, and the like. Polyether-based polyol is generally used. Polyester-based polyol or polyether-based polyol may be used as a main component. Any other polyol may be used.

Examples of the polyester-based polyol include compounds derived from phthalic anhydride, polyester waste, or castor oil, condensed polyester polyol, lactone-based polyester polyol, polycarbonate polyol, and the like.

Polyester polyol preferably has a hydroxy group value (OH value) of 100 mgKOH/g or greater and 400 mgKOH/g or less and a viscosity of 200 Pa·s/25° C. or greater and 4000 mPa·s/25° C. or less from the points of views of compatibility with the foaming agent, the additive(s) or the like, the foaming capability, foam properties and the like.

Preferably usable polyether-based polyol is produced by using an active hydrogen-containing compound such as polypropyleneglycol, polytetramethyleneglycol, a modified substance thereof, sugar, polyhydric alcohol, alcanolamine or the like as an initiator, and incorporating, into the initiator, a cyclic ether such as propyleneoxide, ethyleneoxide, epichlorohydrin, butyleneoxide or the like.

Polyether polyol usually usable has a hydroxy group value of 400 mgKOH/g or greater and 1000 mgKOH/g or less.

The catalyst that may be contained in the premix may be an organic metal-based catalyst or an organic amine-based catalyst. A preferably usable organic metal-based catalyst is an organic tin compound. Examples of the organic tin compound include stannous octoate, stannous laurate, dibutyl tin dilaurate, dibutyl tin dimaleate, dibutyl tin diacetate, dioctyl tin diacetate, and the like. Examples of the organic amine-based catalyst include tertiary amine, for example, triethylenediamine, N-ethylmorpholine, bis(2-dimethylaminoethyl)ether, N,N',N'-triethylethanolamine, and the like.

The foam stabilizer that may be contained in the premix is usually an organic silicon compound-based surfactant. Examples of the organic silicon compound-based surfactant include SH-193, SH-195, SH-200, SRX-253 and the like produced by Toray Silicone K.K.; F-230, F-305, F-341, F-348 and the like produced by Shin-Etsu Chemical Co., Ltd.; L-544, L-5310, L-5320, L-5420, and L-5720 produced by Nippon Unicar K.K.; and TFA-4220, TFA-4202 and the like produced by Toshiba Silicone K.K.

The flame retardant that may be contained in the premix is phosphoric acid ester usable for a hard polyurethane foam or a polyisocyanurate foam. Examples of the phosphoric acid ester include tris(2-chloroethyl)phosphate, tris(2-chloropropyl)phosphate, tris(butoxyethyl)phosphate, trismethylphosphate, trisethylphosphate, triphenylphosphate, tris(isopropylphenyl)phosphate, and the like.

Other additives that may be contained in the premix include additives that improve various properties of the hard polyurethane foam or the polyisocyanurate foam, for example, an ultraviolet preventing agent, a scorch preventing agent, a premix storage stabilizer and the like.

Incorporation of water allows the amount of the fluorine-based foaming agent to be decreased, and thus contributes to making the hard polyurethane foam or the polyisocyanurate foam more economical and also to decrease the steam pressure of the premix. In the case where the premix is stored in the state where water is incorporated thereto and also a polyester-based polyol is incorporated thereto, it is preferable to incorporate, into the premix, a stabilizer formed of an epoxy compound such as 1,2-epoxybutane, 1,2-epoxyhexane, epoxycyclohexane or the like; an unsaturated compound such as α-methylstyrene, ρ-isopropenyltoluene, amylene, and the like; a nitro compound such as nitromethane, nitroethane, nitropropane, nitrotoluene, nitrobenzene or the like; etc.

An azeotropic-like composition according to the present invention, when being used as a foaming agent, is contained at a content of, usually, 5 parts by mass or greater and 80 parts by mass or less, preferably, 10 parts by mass or greater and 70 parts by mass or less, and more preferably, 15 parts by mass or greater and 60 parts by mass or less, with respect to 100 parts by weight of polyol. In the case where the azeotropic-like composition according to the present invention is used at such a content as a foaming agent, a hard polyurethane foam or a polyisocyanurate foam having a density of 20 kg/cm$^3$ or greater, especially of 30 kg/cm$^3$ or greater, and 80 kg/cm$^3$ or less is produced.

These materials quickly react with each other when being mixed to generate a reaction heat, and the mixture is foamed. The mixing temperature is 5° C. or higher and 50° C. or lower, preferably 10° C. or higher and 40° C. or lower, and more preferably 15° C. or higher and 35° C. or lower. An azeotropic-like composition according to the present invention has a steam pressure and therefore is volatilized at such a temperature. However, the composition ratio in a gas phase thereof is substantially the same as that of a liquid phase thereof, and therefore, the azeotropic-like composition contributes to the foam, the heat insulating property, the shape stability at low temperature, and the like.

There is no specific limitation on the method for producing a hard polyurethane foam or a polyisocyanurate foam by use of an azeotropic-like composition according to the present invention. Any of conventionally known methods is usable. For example, the hard polyurethane foam or the polyisocyanurate foam may be produced by a one-shot method or a prepolymer method. A foaming method to obtain the form thereof may be any of various foaming methods including on-the-site foaming, slab foaming, injection foaming (filling method, molding method), laminate foaming, spray foaming, and the like.

<Use as a Silicone Solvent>

An azeotropic-like composition according to the present invention has very high characteristics as a solvent for silicone. More specifically, the azeotropic-like composition according to the present invention has an ozone depletion potential and a global warming potential of substantially zero, is non-flammable, is highly volatile, and is capable of dissolving various types of silicone optionally. The azeotropic-like composition according to the present invention especially has a wide range of azeotropic-like composition ratio. Therefore, a person of ordinary skill in the art is allowed to select an optimal composition ratio in accordance with any of various silicone compounds.

An example of use of the azeotropic-like composition according to the present invention as a silicon solvent that provides a superb effect is surface coating. Generally for surface coating performed in order to protect a surface of a coating target and make the surface lubricious, a silicone solution obtained by dissolving silicone as a lubricant in a volatile solvent is applied to the coating target, and then the solvent is evaporated. For example, an injection needle is coated with silicone in order to be more slippery.

A mixture of an azeotropic-like composition according to the present invention and silicone is usable as a silicone solution.

Any of various types of silicone that are, for example, used for surface coating is usable. Examples of the usable silicone include straight silicone oil such as, for example, dimethyl silicone oil, methylphenyl silicone oil, and methyl hydrogen silicone oil, which are respectively obtained by bonding by use of a methyl group, a phenyl group or a hydrogen atom as a substituent; modified silicone oil containing a part secondarily derived from straight silicone oil, for example, reactive silicone oil and non-reactive silicone oil; etc.

Examples of the usable silicone include silicone containing, as a main component, a copolymer of aminoalkylsiloxane and dimethylsiloxane; silicone containing, as a main component, a reaction product of amino group-containing silane and epoxy group-containing silane, and a reaction product of silanol group-containing polydiorganosiloxane; silicon mixture formed of silicone having an amino group at a side chain or a terminus and polydiorganosiloxane; mixture of silicone obtained by reacting amino group-containing alkoxysilane, epoxy group-containing alkoxysilane and silicone having a silanol group at both of two termini with non-reactive silicone; etc.

An azeotropic-like composition according to the present invention, when being used as a silicone solvent, is contained with respect to a coating silicone solution at a content of 0.1% by mass or greater and 80% by mass of less, especially preferably, 1% by mass or greater and 20% by mass or less. In the case where the content of the azeotropic-like composition according to the present invention with respect to the coating silicone solution is less than 0.1% by mass, a coating film having a sufficient thickness is not easily formed. In the case where the content of the azeotropic-like composition according to the present invention with respect to the coating silicone solution is more than 80% by mass, a coating film having a uniform thickness is not easily formed.

A silicone solution containing an azeotropic-like composition according to the present invention is applied to a surface of a coating target, and the solvent composition containing the azeotropic-like composition according to the present invention is evaporated and thus removed, so that a silicone film is formed on the surface of the coating target. Examples of materials to which such a method according to the present invention is applicable include various materials including metal materials, resin materials, ceramic materials, glass materials, and the like. Especially, the method according to the present invention is applicable to a needle tube of an injection needle, a spring or a spring portion of a dispenser (liquid quantification/atomization device), or the like.

In the case where, for example, a silicone film is to be formed on a needle tube of an injection needle, silicone may be applied to the needle tube of the injection needle by dip-coating as follows. The needle tube of the injection needle is immersed in the silicone solution to apply silicone to an outer surface of the needle tube, and then the injection needle is left at room temperature or a raised temperature to evaporate the solvent composition containing an azeotropic-like composition according to the present invention. Thus, a silicone film is formed.

<Use as a Heat Transfer Medium>

An azeotropic-like composition according to the present invention has superb heat transfer characteristics, and is preferable as a heat transfer medium for a refrigeration cycle system, a high temperature heat pump system, an organic rankine cycle system or the like.

In this specification, the "refrigeration cycle system" refers to a steam-compression type refrigeration cycle system that is mainly provided for cooling, including at least elements of a steamer, a compressor, a condenser, and an expansion valve. The expansion valve is a device that causes throttle expansion of a heat transfer medium, and may be a capillary tube. The refrigeration cycle system may include, in addition to the above-described elements, an internal heat exchanger, a drier, a liquid separator, an oil recovery device, and a non-condensable gas separator. The refrigeration cycle system may be used as a refrigerator, an air-conditioning system or a cooling device.

In this specification, the "high temperature heat pump cycle system" refers to a steam-compression type heat pump cycle system that is mainly provided for heating, including at least elements of a steamer, a compressor, a condenser, and an expansion valve. The expansion valve is a device that causes throttle expansion of a heat transfer medium, and may be a capillary tube. The high temperature heat pump cycle system may include, in addition to the above-described elements, an internal heat exchanger, a drier, a liquid separator, an oil recovery device, and a non-condensable gas separator. The high temperature heat pump cycle system may be used as a hot water supply system, a steam generation system or a heating device. The high temperature heat pump cycle system may use solar energy, waste heat from a plant or the like as a heat source.

In this specification, the "organic rankine cycle system" refers to a rankine cycle system that is mainly provided to convert thermal energy to electric energy, including at least elements of a steamer, an expansion device, a condenser, and a booster pump. The organic rankine cycle system may include, in addition to the above-described elements, an internal heat exchanger, a drier, a liquid separator, an oil recovery device, and a non-condensable gas separator. The organic rankine cycle system may be used as an electric energy generation device that recovers low- or middle-temperature heat. The organic rankine cycle system may use solar energy, waste heat from a plant or the like as a heat source.

Among various azeotropic-like compositions according to the present invention, an azeotropic-like composition containing cis-2-chloro-1,3,3,3-tetrafluoropropene (HCFO-1224xe (Z)) and trans-1-chloro-3,3,3-trifluoropropene (HCFO-1233zd (E)) is especially preferably usable as a heat transfer medium. In the case where an azeotropic-like composition according to the present invention is used as a heat transfer medium, a lubricant, a stabilizer or a flame retardant may be incorporated thereto when necessary.

[Lubricant]

In the case where a heat transfer medium according to the present invention is used as a coolant in a refrigeration cycle system or a high temperature heat pump, examples of the lubricant oil usable in a sliding portion of a compressor include alkylbenzenes (AB) including mineral oil (paraffin-based oil or naphthene-based oil) and synthetic oil, poly (alfa-olefin), esters, polyolesters (POE), polyalkyleneglycols (PAG), and polyvinylethers (PVE). These types of lubricant oil may be used independently or as a combination of two or more thereof.

In the case where a heat transfer medium according to the present invention is used as a working fluid in a rankine cycle system, examples of the lubricant usable in a sliding portion of an expansion device include alkylbenzenes (AB) including mineral oil (paraffin-based oil or naphthene-based oil) and synthetic oil, poly(alfa-olefin), esters, polyolesters (POE), polyalkyleneglycols (PAG), and polyvinylethers (PVE). These types of lubricant oil may be used independently or as a combination of two or more thereof.

Examples of the alkylbenzenes include n-octylbenzene, n-nonylbenzene, n-decylbenzene, n-undecylbenzene, n-dodecylbenzene, n-tridecylbenzene, 2-methyl-1-phenylheptane, 2-methyl-1-phenyloctane, 2-methyl-1-phenylnonane, 2-methyl-1-phenyldecane, 2-methyl-1-phenylundecane, 2-methyl-1-phenyldodecane, 2-methyl-1-phenyltridecane, and the like.

Examples of the esters include aromatic esters including benzoic acid, phthalic acid, isophthalic acid, terephthalic acid, trimellitic acid, pyromellitic acid, a mixture of any of these, and the like; dibasic esters; polyol esters; complex esters; carbonate esters; etc.

Polyol esters are obtained by a reaction of polyhydric alcohol and carboxylic acid. Examples of the polyhydric alcohol used as a material of a polyol ester include hindered alcohols including neopentylglycol, trimethylolethane, trimethylolpropane, trimethylolbutane, di-(trimethylolpropane), tri-(trimethylolpropane), pentaerythritol, di-(pentaerythritol), tri-(pentaerythritol), and the like; ethyleneglycol; 1,3-propanediol; propyleneglycol; 1,4-butanediol; 1,2-butanediol; 2-methyl-1,3-propanediol; 1,5-pentanediol; 1,6-hexanediol; 2-ethyl-2-methyl-1,3-propanediol; 1,7-heptanediol; 2-methyl-2-propyl-1,3-propanediol; 2,2-diethyl-1,3-propanediol; 1,8-octanediol; 1,9-nonanediol; 1,10-decanediol; 1,11-undecanediol; 1,12-dodecanediol; glycerin; polyglycerin; 1,3,5-pentanetriol; sorbitol; sorbitan; sorbitolglycerin condensate; adonitol; arabitol; xylitol; mannitol; xylose; arabinose; ribose; rhamnose; glucose; fructose; galactose; mannose; sorbose; cellobiose; and the like.

Examples of the carboxylic acid as a material of a polyol ester include butanoic acid, 2-methyl propanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, hexanoic acid, 2-methylhexanoic acid, 3-methylbutanoic acid, 4-methylbutanoic acid, 5-methylbutylic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 1,1,2-trimethylbutanoic acid, 1,2,2-trimethylbutanoic acid, 1-ethyl-1-methylbutanoic acid, 1-ethyl-2-methylbutanoic acid, octanoic acid, 2-ethylhexanoic acid, 3-ethylhexanoic acid, 3,5-dimethylhexanoic acid, 2,4-dimethylhexanoic acid, 3,4-dimethylhexanoic acid, 4,5-dimethylhexanoic acid, 2,2-dimethylhexanoic acid, 2-methylheptanoic acid, 3-methylheptanoic acid, 4-methylheptanoic acid, 5-methylheptanoic acid, 6-methylheptanoic acid, 2-propylpentanoic acid, nonanoic acid, 2,2-dimethylheptanoic acid, 2-methyloctanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, 2,2-diisopropylpropanoic acid, acetic acid, propionic acid, heptanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, oleic acid, and the like.

An example of the polyalkyleneglycols is a compound obtained by addition polymerization of ethyleneoxide, propyleneoxide, butyleneoxide or the like to an straight-chain or branched aliphatic alcohol having a carbon number of 1 or greater and 18 or less, such as methanol, ethanol, straight-chain or branched propanol, straight-chain or branched butanol, straight-chain or branched pentanol, straight-chain or branched hexanol or the like.

Examples of the polyvinylethers include polymethylvinylether, polyethylvinylether, poly n-propylvinylether, polyisopropylvinylether, and the like.

There is no specific limitation on the acid value of the lubricant oil contained in a heat transfer medium according to the present invention. In an embodiment according to the present invention, the acid value is preferably 0.1 mgKOH/g or less, and more preferably 0.05 mgKOH/g or less, in order to prevent corrosion of a metal material used in a refrigeration cycle system or the like and also to prevent decomposition of the lubricant oil. In this specification, the "acid value" refers to the acid value measured in conformity to Japanese Industrial Standards JIS K 2501.

There is no specific limitation on the ash content of the lubricant oil contained in a heat transfer medium according to the present invention. In an embodiment according to the present invention, the ash content is preferably 100 ppm or less, and more preferably 50 ppm or less, in order to improve the thermal stability and chemical stability of the lubricant oil and also to suppress generation of sludge. In this specification, the "ash content" refers to the value of the ash content measured in conformity to Japanese Industrial Standards JIS K 2272.

There is no specific limitation on the kinematic viscosity of the lubricant oil contained in a heat transfer medium according to the present invention. In an embodiment, the kinematic viscosity at 40° C. is preferably 3 mm$^2$/s or greater and 1000 mm$^2$/s or less, more preferably 4 mm$^2$/s or greater and 500 mm$^2$/s or less, and most preferably 5 mm$^2$/s or greater and 400 mm$^2$/s or less. The kinematic viscosity at 100° C. is preferably 1 mm$^2$/s or greater and 100 mm$^2$/s or less.

[Stabilizer]

In the case where an azeotropic-like composition according to the present invention is used as a heat transfer medium, a stabilizer may be used in order to improve the thermal stability, the oxidation resistance and the like. Examples of the stabilizer include nitro compounds, epoxy compounds, phenols, imidazoles, amines, hydrocarbons and the like.

As a nitro compound, any known compound is usable. Aliphatic and/or aromatic derivatives are usable. Examples of the aliphatic nitro compounds include nitromethane, nitroethane, 1-nitropropane, 2-nitropropane, and the like. Examples of the aromatic nitro compounds include nitrobenzene, o-, m-, or p-dinitrobenzene, trinitrobenzene, o-, m-, or p-nitrotoluene, o-, m-, or p-ethylnitrobenzene, 2,3-, 2,4-, 2,5-, 2,6-, 3,4-, or 3,5-dimethylnitrobenzene, o-, m-, or p-nitroacetophenone, o-, m-, or p-nitrophenol, o-, m-, or p-nitroanisole, and the like.

Examples of the epoxy compounds include monoepoxy-based compounds including ethyleneoxide, 1,2-butyleneoxide, propyleneoxide, styreneoxide, cyclohexeneoxide, glycidol, epichlorohydrin, glycidylmethacrylate, phenylglycidylether, allylglycidylether, methylglycidylether, butylglycidylether, 2-ethylhexylglycidylether, and the like; polyepoxy-based compounds including diepoxybutane, vinylcyclohexenedioxide, neopentylglycoldiglycidylether, ethyleneglycoldiglycidylether, glycerinpolyglycidylether, trimethylolpropanetriglycidylether, and the like; etc.

Examples of the phenols include phenols each containing any of various substituents including an alkyl group, an alkenyl group, an alkoxy group, a carboxyl group, a carbonyl group, halogen or the like as well as a hydroxy group. Examples of the phenols include monohydric phenols including 2,6-di-t-butyl-p-cresol, o-cresol, m-cresol, p-cresol, thymol, p-t-butylphenol, o-methoxyphenol, m-methoxyphenol, p-methoxyphenol, eugenol, isoeugenol, butylhydroxyanisole, phenol, xylenol, and the like; dihydric phenols including t-butylcatechol, 2,5-di-t-aminohydroquinone, 2,5-di-t-butylhydroquinone, and the like; etc.

Examples of the imidazoles include the following imidazoles each having, as an N-position substituent, a straight-chain or branched alkyl group, cycloalkyl group or aryl group having a carbon number of 1 or greater and 18 or less: 1-methylimidazole, 1-n-butylimidazole, 1-phenylimidazole, 1-benzylimidazole, 1-(β-oxyethyl)imidazole, 1-methyl-2-propylimidazole, 1-methyl-2-isobutylimidazole, 1-n-butyl-2-methylimidazole, 1,2-dimethylimidazole, 1,4-dimethylimidazole, 1,5-dimethylimidazole, 1,2,5-trimethylimidazole, 1,4,5-trimethylimidazole, 1-ethyl-2-methylimidazole, and the like. These compounds may be used independently or as a compound of two or more thereof.

Examples of the amines include pentylamine, hexylamine, diisopropylamine, diisobutylamine, di-n-propylamine, diallylamine, triethylamine, N-methylaniline, pyridine, morpholine, N-methylmorpholine, triallylamine, allylamine, α-methylbenzylamine, methylamine, dimethylamine, trimethylamine, ethylamine, diethylamine, propylamine, isopropylamine, dipropylamine, butylamine, isobutylamine, dibutylamine, tributylamine, dipentylamine, tripentylamine, 2-ethylhexylamine, aniline, N,N-dimethylaniline, N, N-diethylaniline, ethylenediamine, propylenediamine, diethylenetriamine, tetraethylenepentamine, benzylamine, dibenzylamine, diphenylamine, diethylhydroxylamine, and the like. These compounds may be used independently or as a compound of two or more thereof.

Examples of the hydrocarbons include α-methylstyrene, p-isopropenyltoluene, isoprenes, propadienes, terpenes, and the like. These compounds may be used independently or as a compound of two or more thereof.

The stabilizer may be incorporated into one of, or both of, the coolant and the lubricant in advance, or may be put into a condenser independently. There is no specific limitation on the amount of the stabilizer. The stabilizer is contained at a content of, preferably, 0.001% by mass or greater and 10% by mass or less, more preferably, 0.01% by mass or greater and 5% by mass or less, and still more preferably, 0.02% by mass or greater and 2% by mass or less, with respect to the main coolant (100% by mass). In the case where the content of the stabilizer is more than the upper limit or less than the lower limit, the stability, the heat cycle performance and the like of the coolant are not sufficiently high.

In a refrigeration cycle system or a high temperature heat pump cycle system, the pressure, in a high pressure portion, of the heat transfer medium containing an azeotropic-like composition according to the present invention as described above is determined by the composition ratio and the condensation temperature of the heat transfer medium. Namely, in a refrigeration cycle system or a high temperature heat pump cycle system, the pressure, in a high pressure portion, of the heat transfer medium is equal to the pressure of the saturated steam of the heat transfer medium at the condensation temperature. By contrast, in an organic rankine cycle system, the pressure, in a high pressure portion, of the heat transfer medium containing an azeotropic-like composition according to the present invention as described above is determined by the composition ratio and the evaporation temperature of the heat transfer medium. Namely, in an organic rankine cycle system, the pressure, in a high pressure portion, of the heat transfer medium is equal to the pressure of the saturated steam of the heat transfer medium at the evaporation temperature. In general, when the pressure in the high pressure portion exceeds 0.5 MPa, a compressor or an expansion device, a heat exchanger and pipes are required to have a high pressure resistance and thus cost high, which is not preferable. In the case where the heat transfer medium according to the present invention is used, the pressure in the high pressure portion is made lower than 5.0 MPa, and thus a compressor, an expansion device, a heat exchanger and pipes that are known are usable.

A heat transfer medium containing an azeotropic-like composition according to the present invention is non-flammable, has little load on the environment, and has superb heat cycle characteristics. Therefore, the heat transfer medium is usable as a thermal medium for a high temperature heat pump that is used to generate pressurized warm water, overheated steam or the like, as a working fluid for an organic rankine cycle that is used for an electric energy generation system or the like, as a coolant for a steam compression-type refrigeration cycle system, as a medium for an absorption-type heat pump, a heat pipe or the like, or as a washing detergent for cycle washing in a cooling system or a heat pump system.

A heat transfer medium containing an azeotropic-like composition according to the present invention is applicable to an electric energy generation system, a heat-pump hot water supply system, a heat-pump steam generation system or the like of a large plant scale as well as to a package-type compact device (rankine cycle system, heat pump cycle system, etc.).

EXAMPLES

Hereinafter, the present invention will be described in detail by way of examples. The present invention is not limited to any of the following examples.

Method for Producing 2-Chloro-1,3,3,3-Tetrafluoropropene (HCFO-1224xe)

First, a method for synthesizing 2-chloro-1,3,3,3-tetrafluoropropene (HCFO-1224xe) will be specifically described below. The method for synthesizing HCFO-1224xe is not limited to the following method.

Synthesis Example of HCFC-234da

A gas-washing bottle formed of glass (1000 cc) cooled in a dry ice-acetone bath was supplied with trans-1,3,3,3-tetrafluoropropene (HFO-1234ze (E)) (777.45 g, 6.81 mol). While the gas-washing bottle was irradiated with light from an ultraviolet lamp and HFO-1234ze (E) in the gas-washing bottle was stirred by a magnetic stirrer, 483.58 g (6.81 mol) of chlorine gas was put into the gas-washing bottle at a rate of 2 g/min. As a result, 1222.59 g of 2,3-dichloro-1,1,1,3-tetrafluoropropane (HCFC-234da) having a purity of 98.54 GC area % was obtained. This operation was repeated to obtain a material.

Synthesis Example of HCFO-1224xe

A four-neck flask (2000 cc) equipped with a Dimroth condenser (coolant temperature: −15° C.), a 300 mL dropping funnel, a thermometer and a stirrer was supplied with 4.57 g (0.014 mol) of tetrabutylammoniumbromide and 1139.19 g (6.16 mol) of HCFC-234da, and was immersed in an ice water bath of 0° C. The substances in the flask started to be stirred. From the dropping funnel, 1054.59 g of 25% by weight aqueous solution of sodium hydroxide (1.07 equivalent with respect to HCFC-234da) was dropped over 149 minutes. The Dimroth condenser and the dropping funnel were detached and a 30 cm vigreux column is attached to assemble a single column distillation device. The substance in the flask was distilled, and as a result, 575.75 g of organic substance was recovered. The composition ratio of the substance was analyzed by gas chromatography to find that HCFO-1224xe (Z) had a purity of 56.053 GC area % and that HCFO-1224xe (E) had a purity of 35.68 GC area %. The resultant product was separated by use of a distillation column having a 46 theoretical stages filled with Helipack No. 2 into HCFO-1224xe (E) and HCFO-1224xe (Z). As a result, 269.92 g of HCFO-1224xe (Z) (purity: 99.47 GC area %) and 49.33 g of HCFO-1224xe (E) (purity: 99.56 GC area %) were obtained. Samples of these substances were partially subjected to precision distillation to obtain HCFO-1224xe (Z) and HCFO-1224xe (E) each having a purity of 99.9 GC area % or greater. This operation was repeated to obtain a sample of each of highly pure trans-2-chloro-1,3,3,3-tetrafluoropropene (HCFO-1224xe (E)) and highly pure cis-2-chloro-1,3,3,3-tetrafluoropropene (HCFO-1224xe (Z)). These samples were used to produce an azeotropic-like composition according to the present invention.

In the process for producing the azeotropic-like composition according to the present invention, trans-1-chloro-3,3,3-trifluoropropene (HCFO-1233zd (E)) was produced based on Japanese Laid-Open Patent Publication No. 2014-028800, and cis-1-chloro-3,3,3-trifluoropropene (HCFO-1233zd (Z)) was produced based on Japanese Laid-Open Patent Publication No. 2014-024821. As a result, the substances each having a purity of 99.99% were obtained.

<Azeotropic-Like Compound by a Combination of HCFO-1224xe (E) and HCFO-1233zd (E)>

The present inventors examined, by gas chromatography analysis using a head space method, the composition ratios in a liquid phase and a gas phase of a mixture of trans-2-chloro-1,3,3,3-tetrafluoropropene (HCFO-1224xe (E)) and trans-1-chloro-3,3,3-trifluoropropene (HCFO-1233zd (E)).

[Step 1]

A vial having a capacity of 20 mL (head space vial; produced by Agilent Technologies) was closed with an aluminum cap of PTFE/white silicone septum (produced by Agilent Technologies). Then, a 100 mL syringe including a 22-gauge injection needle (injection cylinder: formed of polypropylene; sealing portion and plunger portion: formed of polyethylene) was used to decrease the pressure in the vial. Next, about 5 mL of HCFO-1233zd (E) was sampled with a 10 mL syringe including a 22-gauge injection needle (injection cylinder: formed of polypropylene; sealing portion and plunger portion: formed of polyethylene), air was released from the syringe, and then HCFO-1233ze (E) was put into the vial.

[Step 2]

Then, the vial was immersed in a hot water bath controlled to be 25° C. so that the temperature of the sample was 25° C., and the sample was left still. After a gas-liquid equilibrium state was obtained, 1 mL of gas phase in the vial was sampled with a 10 mL gas tight syringe and analyzed by gas chromatography. Then, 1 mL of liquid phase in the vial was sampled with a 5 mL syringe including a 22-gauge injection needle (injection cylinder: formed of polypropylene; sealing portion and plunger portion: formed of polyethylene) and transferred to a 2 mL sample bottle cooled with ice. The composition ratio of the liquid was analyzed by gas chromatography (GC-17A produced by Shimadzu Corporation).

[Step 3]

A 10 mL syringe including a 22-gauge injection needle (injection cylinder: formed of polypropylene; sealing portion and plunger portion: formed of polyethylene) was used to add HCFO-1233zd (E) and HCFO-1224xe (E) at an optional ratio, such that the total amount of the liquid in the vial used in step 1 would be 5 mL. The resultant liquid was sampled and analyzed by gas chromatography in substantially the same manner as in step 2. For adding a small amount of HCFO-1224xe (E), a 10 µL gas chromatography syringe was used instead of the 10 mL syringe. Separately, for producing a composition containing a small amount of HCFO-1233zd (E), substantially the same operation as in step 1 was performed except that HCFO-1224xe (E) was added instead of HCFO-1233zd (E). Then, sampling and gas chromatography analysis (GC-17A produced by Shimadzu Corporation) were performed in substantially the same manner as in step 2.

[Step 4]

From the ratio of the measured peak area % of the gas phase and the liquid phase of HCFO-1233zd (E) obtained in steps 1 through 3 described above, a calibration curve with respect to the peak area and the molar ratio was created in advance, and the molar ratio was derived from the measured peak area. The results are shown in Table 1.

Figure 2:
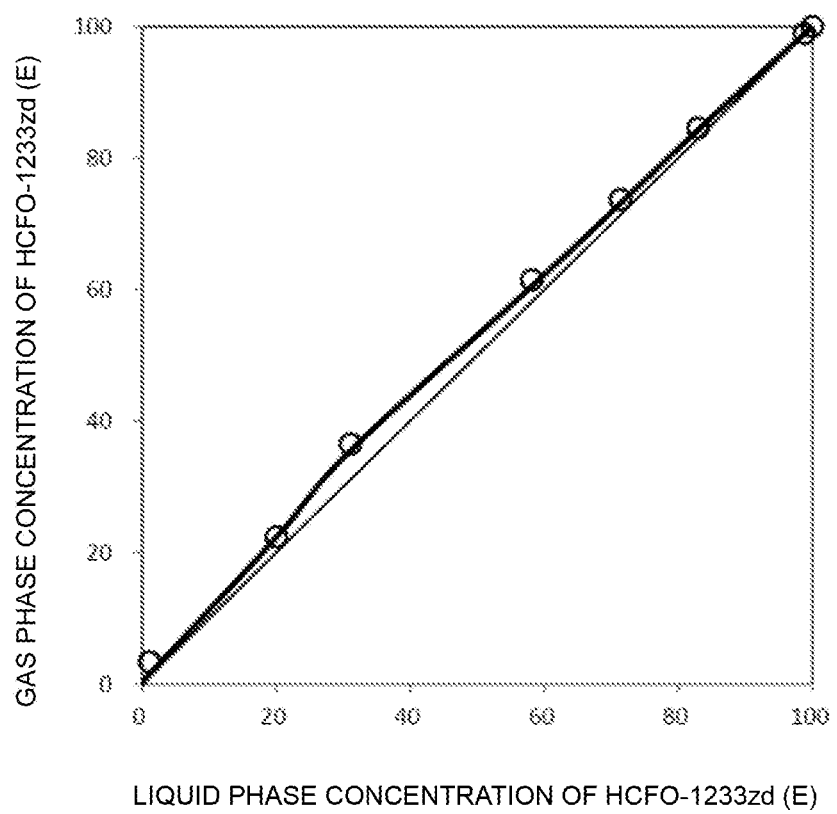
FIG. 2 shows a gas-liquid equilibrium curve of trans-1-chloro-3,3,3-trifluoropropene (HCFO-1233zd (E)) in a mixture according to the present invention containing trans-2-chloro-1,3,3,3-tetrafluoropropene (HCFO-1224xe (E)) and trans-1-chloro-3,3,3-trifluoropropene (HCFO-1233zd (E)).

FIG. 2 shows a gas-liquid equilibrium curve of HCFO-1233zd (E) of a mixture according to the present invention containing HCFO-1224xe (E) and HCFO-1233zd (E). Table 1 below shows the molar percentage (mol %) and the results of gas chromatography analysis (GC %) of a mixture of HCFO-1224xe (E) (boiling point: 24° C.) and HCFO-1233zd (E) (boiling point: 19° C.) in each of the gas phase and the liquid phase.

had substantially the same composition ratio in the gas phase and the liquid phase. Even if there was a difference, the difference was negligible. From this, it is seen that a mixture containing HCFO-1224xe (E) at a content in the range of 0.001 mol % or greater and 99 mol % or less and containing HCFO-1233zd (E) at a content in the range of 1 mol % or greater and 99.999 mol % or less is preferable as an azeotropic-like composition according to the present invention.

<Azeotropic-like compound by a combination of HCFO-1224xe (Z) and HCFO-1233zd (E)>

The present inventors examined, by gas chromatography analysis using the head space method, the composition ratios in a liquid phase and a gas phase of a mixture of cis-2-chloro-1,3,3,3-tetrafluoropropene (HCFO-1224xe (Z)) and trans-1-chloro-3,3,3-trifluoropropene (HCFO-1233zd (E)).

A vial having a capacity of 20 mL (head space vial) was supplied with HCFO-1233zd (E) and HCFO-1224xe (Z) at predetermined mol percentage (mol %) after the mass thereof was measured by precision balance scales. The gas chromatography by the head space method was performed in substantially the same manner as described above.

Figure 3:
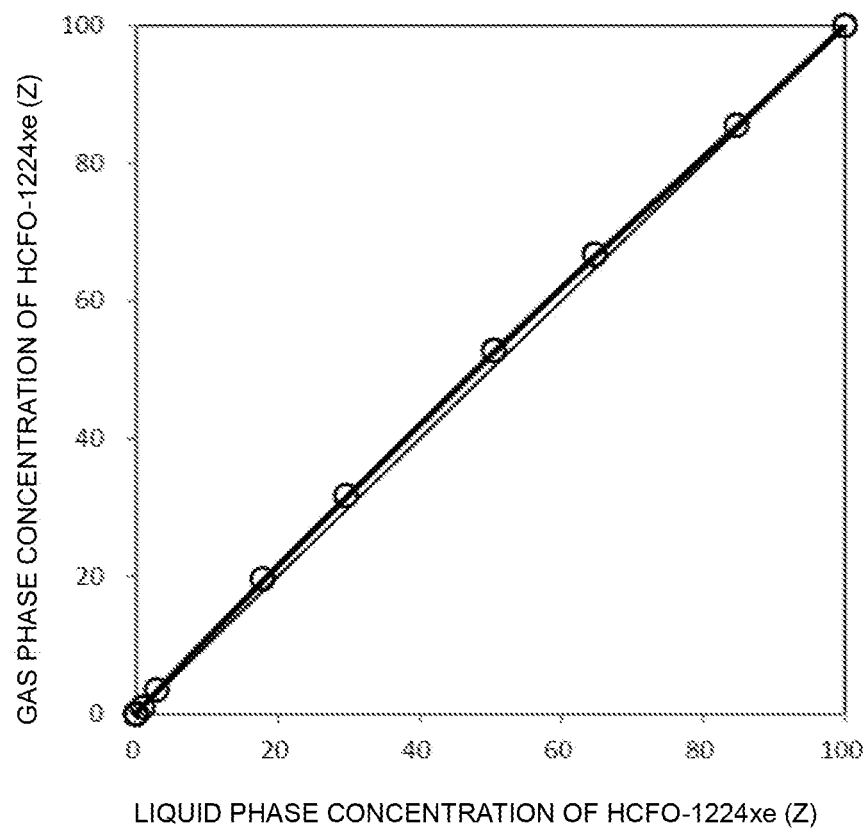
FIG. 3 shows a gas-liquid equilibrium curve of cis-2-chloro-1,3,3,3-tetrafluoropropene (HCFO-1224xe (Z)) in a mixture according to the present invention containing cis-2-chloro-1,3,3,3-tetrafluoropropene (HCFO-1224xe (Z)) and trans-1-chloro-3,3,3-trifluoropropene (HCFO-1233zd (E)).

FIG. 3 shows a gas-liquid equilibrium curve of HCFO-1224xe (Z) of a mixture according to the present invention containing HCFO-1224xe (Z) and HCFO-1233zd (E). Table 2 below shows the molar percentage (mol %) and the results of gas chromatography analysis (GC %) of a mixture of HCFO-1224xe (Z) (boiling point: 17° C.) and HCFO-1233zd (E) (boiling point: 19° C.) in each of the gas phase and the liquid phase.

TABLE 1

Gas-liquid equilibrium of HCFO-1224xe(E) and HCFO-1233zd(E) (azeotropic-like)

| GAS PHASE | | | | LIQUID PHASE | | | |
|---|---|---|---|---|---|---|---|
| HCFO-1224xe(E) | | HCFO-1233zd(E) | | HCFO-1224xe(E) | | HCFO-1233zd(E) | |
| GC % | mol % | GC % | mol % | GC % | mol % | GC % | mol % |
| 0.0011 | 0.0012 | 99.9983 | 99.9988 | 0.0021 | 0.0012 | 99.9982 | 99.9988 |
| 0.9662 | 1.0752 | 98.9757 | 98.9248 | 1.0727 | 1.1933 | 98.8919 | 98.8067 |
| 14.0955 | 15.4640 | 85.7929 | 84.5360 | 15.5748 | 17.0552 | 84.3348 | 82.9448 |
| 24.2589 | 26.3281 | 75.5798 | 73.6719 | 26.4317 | 28.6109 | 73.4304 | 71.3891 |
| 35.9573 | 38.5459 | 63.8279 | 61.4541 | 39.1862 | 41.8947 | 60.6239 | 58.1503 |
| 60.7943 | 63.5389 | 38.8422 | 36.4611 | 66.3716 | 68.9137 | 33.3348 | 31.0863 |
| 75.4227 | 77.6556 | 24.1629 | 22.3444 | 77.8736 | 79.9362 | 21.7626 | 20.0638 |
| 95.8205 | 96.6837 | 3.6594 | 3.3163 | 98.3035 | 98.8600 | 1.2621 | 1.1400 |

Referring to FIG. 2 and Table 1, the mixture containing a combination of HCFO-1233zd (E) and HCFO-1224xe (E)

TABLE 2

Gas-liquid equilibrium of HCFO-1224xe(Z) and HCFO-1233zd(E) (azeotropic-like)

| GAS PHASE | | | | LIQUID PHASE | | | |
|---|---|---|---|---|---|---|---|
| HCFO-1224xe(Z) | | HCFO-1233zd(E) | | HCFO-1224xe(Z) | | HCFO-1233zd(E) | |
| GC % | mol % | GC % | mol % | GC % | mol % | GC % | mol % |
| 0.0009 | 0.0010 | 99.9861 | 99.9990 | 0.0009 | 0.0010 | 99.9872 | 99.9990 |
| 0.0023 | 0.0026 | 99.9801 | 99.9974 | 0.0019 | 0.0021 | 99.9850 | 99.9979 |
| 0.8804 | 0.9795 | 99.0938 | 99.0205 | 0.8236 | 0.9163 | 99.1586 | 99.0837 |

TABLE 2-continued

Gas-liquid equilibrium of HCFO-1224xe(Z) and HCFO-1233zd(E) (azeotropic-like)

| GAS PHASE | | | | LIQUID PHASE | | | |
|---|---|---|---|---|---|---|---|
| HCFO-1224xe(Z) | | HCFO-1233zd(E) | | HCFO-1224xe(Z) | | HCFO-1233zd(E) | |
| GC % | mol % | GC % | mol % | GC % | mol % | GC % | mol % |
| 3.1690 | 3.5174 | 96.7828 | 96.4826 | 2.5992 | 2.8864 | 97.3692 | 97.1136 |
| 17.9599 | 19.6370 | 81.8344 | 80.3630 | 16.3086 | 17.8512 | 83.5604 | 82.1488 |
| 29.3744 | 31.7492 | 70.3064 | 68.2508 | 27.3710 | 29.6219 | 72.4045 | 70.3781 |
| 49.8744 | 52.8109 | 49.6189 | 47.1891 | 47.6070 | 50.4724 | 52.0134 | 49.5276 |
| 63.9622 | 66.8052 | 35.3862 | 33.1948 | 61.8815 | 64.6788 | 37.6258 | 35.3212 |
| 83.2379 | 85.5244 | 15.6862 | 14.4756 | 82.7067 | 84.7261 | 16.6006 | 15.2739 |
| 98.7356 | 99.9969 | 0.0034 | 0.0031 | 99.1682 | 99.9968 | 0.0035 | 0.0032 |

Referring to FIG. 3 and Table 2, the mixture containing a combination of HCFO-1224xe (Z) and HCFO-1233zd (E) had substantially the same composition ratio in the gas phase and the liquid phase. From this, it is seen that a mixture containing HCFO-1224xe (Z) at a content in the range of 0.001 mol % or greater and 99.999 mol % or less and containing HCFO-1233zd (E) at a content in the range of 0.001 mol % or greater and 99.999 mol % or less is preferable as an azeotropic-like composition according to the present invention.

The present inventors measured the boiling points of mixtures of cis-2-chloro-1,3,3,3-tetrafluoropropene (HCFO-1224xe (Z)) and trans-1-chloro-3,3,3-trifluoropropene (HCFO-1233zd (E)).

Figure 4:
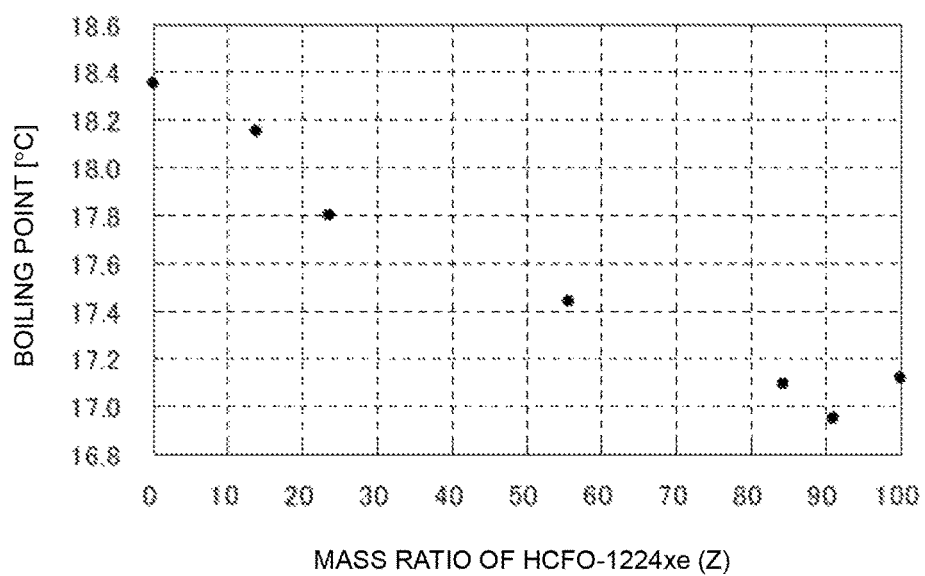
FIG. 4 shows a boiling point with respect to the mass ratio of cis-2-chloro-1,3,3,3-tetrafluoropropene (HCFO-1224xe (Z)).

First, a pressure resistant container formed of SUS316 including a strain gauge-type pressure converter was filled with each of two-component compositions containing cis-2-chloro-1,3,3,3-tetrafluoropropene (HCFO-1224xe (Z)) and trans-1-chloro-3,3,3-trifluoropropene (HCFO-1233zd (E)). The air remaining in the pressure resistant container was removed by a vacuum pump in a state where the composition was cooled and solidified with liquid nitrogen. The pressure resistant container was left still in a thermostat water tank, and the temperature of the thermostat water tank was varied such that the pressure of the composition would be the standard atmosphere (101.3 kPa). The temperature of the composition was measured by a platinum resistance thermometer. The temperature at which the pressure of the composition was 101.3 kPa (boiling point) was measured. The boiling points of the compositions are shown in Table 3. FIG. 4 shows the boiling points of the compositions with respect to the mass ratio of HCFO-1224xe (Z).

TABLE 3

| MASS % | | mol % | | BOILING POINT [° C.] |
|---|---|---|---|---|
| HCFO-1224xe(Z) | HCFO-1233zd(E) | HCFO-1224xe(Z) | HCFO-1233zd(E) | |
| 100.0 | 0.00 | 100.00 | 0.00 | 17.12 |
| 91.13 | 8.87 | 90.03 | 9.97 | 16.95 |
| 84.45 | 15.55 | 82.68 | 17.32 | 17.09 |
| 55.70 | 44.30 | 52.49 | 47.51 | 17.44 |
| 23.60 | 76.40 | 21.35 | 78.65 | 17.80 |
| 13.86 | 86.14 | 12.39 | 87.61 | 18.15 |
| 0.00 | 100.00 | 0.00 | 100.00 | 18.35 |

As shown in Table 3, the two-component compositions containing HCFO-1224xe (Z) and HCFO-1233zd (E) showed a boiling point lower than that of a pure substance at a mass ratio of HCFO-1224xe (Z)/HCFO-1233zd (E), 91.1/8.9. This indicates that a two-component azeotropic-like composition having the minimum azeotropic point at the above-described mass ratio had been formed. The compositions each containing HCFO-1224xe (Z) at a content of more than 0% by mass or greater and 100% by mass or less showed a difference in the boiling point of 1.4° C. or less. From this, it is seen that the above-described compositions form an azeotropic composition and/or azeotropic-like composition in the above-described composition ratio range.

The difference in the boiling point was 0.5° C. or less among the compositions containing HCFO-1224xe (Z) at a content of 55.7% by mass or greater and 100% by mass or less. From this, it is seen that a combination of HCFO-1224xe (Z) and HCFO-1233zd (E) forms a more preferable azeotropic composition and/or azeotropic-like composition.

<Azeotropic-Like Compound by a Combination of HCFO-1224xe (E) and HCFO-1233zd (Z)>

The present inventors examined, by gas chromatography analysis using the head space method, the composition ratios in a liquid phase and a gas phase of a mixture of trans-2-chloro-1,3,3,3-tetrafluoropropene (HCFO-1224xe (E)) and cis-1-chloro-3,3,3-trifluoropropene (HCFO-1233zd (Z)).

A vial having a capacity of 20 mL (head space vial) was supplied with HCFO-1233zd (Z) and HCFO-1224xe (E) at predetermined mol percentage (mol %) after the mass thereof was measured by precision balance scales. The gas chromatography analysis by the head space method was performed in substantially the same manner as described above.

Figure 5:
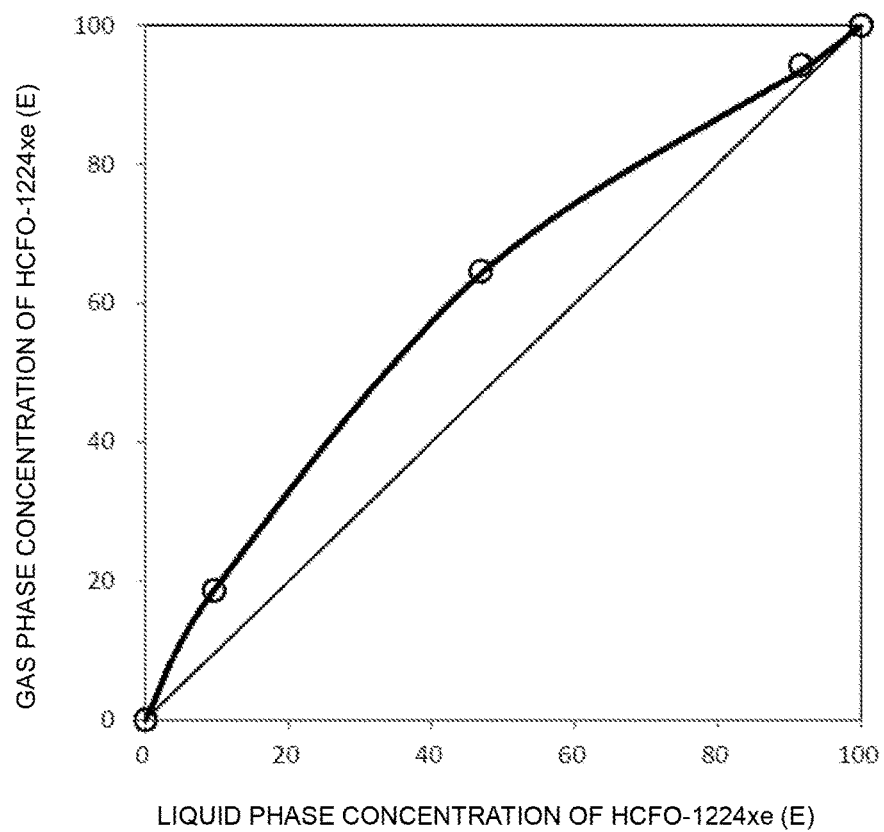
FIG. 5 shows a gas-liquid equilibrium curve of trans-2-chloro-1,3,3,3-tetrafluoropropene (HCFO-1224xe (E)) in a mixture according to the present invention containing trans-2-chloro-1,3,3,3-tetrafluoropropene (HCFO-1224xe (E)) and cis-1-chloro-3,3,3-trifluoropropene (HCFO-1233zd (Z)).

FIG. 5 shows a gas-liquid equilibrium curve of HCFO-1224xe (E) of a mixture according to the present invention containing HCFO-1224xe (E) and HCFO-1233zd (Z). Table 4 below shows the molar percentage (mol %) and the results of gas chromatography analysis (GC %) of a mixture of HCFO-1224xe (E) (boiling point: 24° C.) and HCFO-1233zd (Z) (boiling point: 19° C.) in each of the gas phase and the liquid phase.

TABLE 4

Gas-liquid equilibrium of HCFO-1224xe(E) and HCFO-1233zd(Z)
(azeotropic-like with specific composition ratio)

| GAS PHASE | | | | LIQUID PHASE | | | |
|---|---|---|---|---|---|---|---|
| HCFO-1224xe(E) | | HCFO-1233zd(Z) | | HCFO-1224xe(E) | | HCFO-1233zd(Z) | |
| GC % | mol % | GC % | mol % | GC % | mol % | GC % | mol % |
| 93.1824 | 94.2825 | 6.2916 | 5.7175 | 90.3232 | 91.5840 | 9.2414 | 8.4160 |
| 61.8512 | 64.6065 | 37.7265 | 35.3935 | 44.0909 | 46.8602 | 55.6694 | 53.1398 |
| 17.0594 | 18.6867 | 82.6502 | 81.3133 | 8.6922 | 9.5964 | 91.1713 | 90.4036 |

Referring to FIG. 5 and Table 4, a mixture containing HCFO-1224xe (E) at a content in the range of 90 mol % or greater and 99.9 mol % or less and containing HCFO-1233zd (Z) at a content in the range of 0.1 mol % or greater and 10 mol % or less is preferable as an azeotropic-like composition according to the present invention.

<Mixture by a Combination of HCFO-1224xe (Z) and HCFO-1233zd (Z)>

Figure 6:
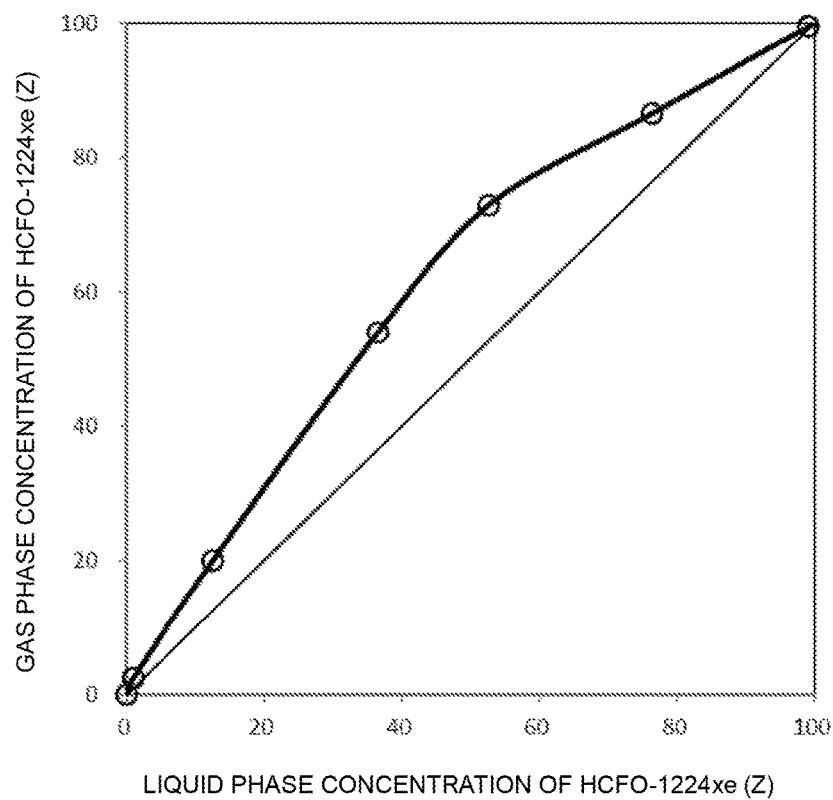
FIG. 6 shows a gas-liquid equilibrium curve of cis-2-chloro-1,3,3,3-tetrafluoropropene (HCFO-1224xe (Z)) in a mixture according to the present invention containing cis-2-chloro-1,3,3,3-tetrafluoropropene (HCFO-1224xe (Z)) and cis-1-chloro-3,3,3-trifluoropropene (HCFO-1233zd (Z)).

The present inventors examined, by gas chromatography analysis using the head space method, the composition ratios in a liquid phase and a gas phase of a mixture of cis-2-chloro-1,3,3,3-tetrafluoropropene (HCFO-1224xe (Z)) and cis-1-chloro-3,3,3-trifluoropropene (HCFO-1233zd (Z)). The gas chromatography analysis by the head space method was performed in substantially the same manner as described above. FIG. 6 shows a gas-liquid equilibrium curve of HCFO-1224xe (Z) of a mixture formed of HCFO-1224xe (Z) and HCFO-1233zd (Z). Table 5 shows the molar percentage (mol %) and the results of gas chromatography analysis (GC %) of a mixture of HCFO-1224xe (Z) (boiling point: 24° C.) and HCFO-1233zd (Z) (boiling point: 19° C.) in each of the gas phase and the liquid phase.

TABLE 5

Gas-liquid equilibrium of HCFO-1224xe(Z) and HCFO-1233zd(Z)
(non-azeotropic)

| GAS PHASE | | | | LIQUID PHASE | | | |
|---|---|---|---|---|---|---|---|
| HCFO-1224xe(Z) | | HCFO-1233zd(Z) | | HCFO-1224xe(Z) | | HCFO-1233zd(Z) | |
| GC % | mol % | GC % | mol % | GC % | mol % | GC % | mol % |
| 2.21774 | 2.4680 | 97.5797 | 97.5320 | 0.87066 | 0.9691 | 99.06017 | 99.0309 |
| 18.2722 | 19.9775 | 81.4914 | 80.0225 | 11.4110 | 12.5629 | 88.4264 | 87.4371 |
| 51.1181 | 53.9326 | 48.6148 | 46.0674 | 34.0070 | 36.5230 | 65.8066 | 63.4770 |
| 70.5473 | 72.8451 | 29.2806 | 27.1549 | 49.8985 | 52.6810 | 49.9022 | 47.3190 |
| 84.95078 | 86.4804 | 14.7865 | 13.5196 | 74.1904 | 76.3632 | 25.5684 | 23.6368 |
| 99.13176 | 99.4965 | 0.5586 | 0.5035 | 98.72374 | 99.1152 | 0.98127 | 0.8848 |

Referring to FIG. 6 and Table 5, it is seen that a mixture containing a combination of HCFO-1224xe (Z) and HCFO-1233zd (Z) is non-azeotropic regardless of the composition ratio between HCFO-1224xe (Z) and HCFO-1233zd (Z) in the mixture.

Hereinafter, performance, as a washing detergent, of an azeotropic-like composition according to the present invention containing 2-chloro-1,3,3,3-tetrafluoropropene (HCFO-1224xe) and 1-chloro-3,3,3-trifluoropropene (HCFO-1233zd) will be described by way of examples.

Example 1

<Washing Test A>

A commercially available 25 cc graduated cylinder was cut along a scale line of 11 cc. The mass of a clean glass rod having a diameter of about 7.2 mm and a length of about 40 mm was measured. After the measurement, the glass rod was immersed in oil of each type shown in the table for 2 minutes, and then was kept standing for 10 minutes to remove the liquid (to remove the excessive oil). After this, the mass thereof (glass rod+initially attached oil) was measured, and the rod was put into the above-described graduated cylinder. An azeotropic-like composition formed of compound A and compound B shown in Table 6 was put into the graduated cylinder up to a liquid surface of 10 cc, and the graduated cylinder was made to stand at a center of a compact ultrasonic washing device (SW5800 produced by Citizen Systems Japan Co., Ltd.) filled with 20° C. water. When being irradiated with the ultrasonic waves, the azeotropic-like composition was volatilized along with time. When being decreased to reach a scale line of 8 cc, the liquid in the graduated cylinder was analyzed by gas chromatography. In each of all examples 1-a through 1-j, the composition ratio in the liquid was substantially the same before and after the washing although 2 cc was volatilized. Namely, the composition formed of compound A and compound B used in each of examples 1-a through 1-j has been shown, by actual washing by a washing device, to be an azeotropic-like composition, which, even if partially volatilized, is not substantially changed in the composition ratio of the remaining liquid. Next, the glass rod was dried, and the mass thereof (total mass of the glass rod and the remaining oil) was measured. The oil removal ratio (mass of the remaining oil÷ mass of the initially attached oil×100[%]) was found, and the surface of the glass rod was observed with a magnifying glass. In all the examples, the oil removal ratio was 100%, and no remaining oil was observed with the magnifying glass. Therefore, the compositions in all the examples were determined as being good. The results of the examples and comparative examples are shown in Table 7 below.

In comparative examples, substantially the same test as performed on examples 1-a through 1-j was performed on commercially available fluorine-based washing detergents, specifically, HFC-365mfc ($CH_3CF_2CH_2CF_3$ produced by Nippon Solvay K.K.) and HFC-43-10mee ($CH_3CHFCHFCF_2CF_3$ produced by DuPont), instead of the azeotropic-like compositions used in the examples. In each of the comparative examples, the oil remained in both of the oil removal ratio test and the observation test with the magnifying glass, and these washing detergents were determined as not being good.

TABLE 6

|  |  |  | PRE-WASHING COMPOSITION RATIO [GC %] | |
| --- | --- | --- | --- | --- |
|  | COMPOUND A | COMPOUND B | COMPOUND A | COMPOUND B |
| EXAMPLE 1-a | HCFO-1224xe(Z) | HCFO-1233zd(E) | 0.0015 | 99.9977 |
| EXAMPLE 1-b |  |  | 5.5364 | 94.4629 |
| EXAMPLE 1-c |  |  | 14.8835 | 85.1159 |
| EXAMPLE 1-d |  |  | 51.2365 | 48.7626 |
| EXAMPLE 1-e |  |  | 78.9841 | 21.015 |
| EXAMPLE 1-f |  |  | 98.9865 | 1.0127 |
| EXAMPLE 1-g | HCFO-1224xe(E) |  | 89.4639 | 10.5354 |
| EXAMPLE 1-h |  |  | 9.2868 | 90.7124 |
| EXAMPLE 1-i |  |  | 0.0006 | 99.9993 |
| EXAMPLE 1-j |  | HCFO-1233zd(Z) | 97.2547 | 2.7445 |
| COMPARATIVE EXAMPLE 1-a |  | HFC-365mfc ($CH_3CF_2CH_2CF_3$) | | |
| COMPARATIVE EXAMPLE 1-b |  | HFC-365mfc ($CH_3CF_2CH_2CF_3$) | | |
| COMPARATIVE EXAMPLE 1-c |  | HFC-43-10mee ($CF_3CHFCHFCF_2CF_3$) | | |
| COMPARATIVE EXAMPLE 1-d |  | HFC-43-10mee ($CF_3CHFCHFCF_2CF_3$) | | |

TABLE 7

|  | PRE-WASHING COMPOSITION RATIO (GC %) | | TYPE OF OIL | OIL REMOVAL RATIO (%) | OBSERVATION RESULT WITH MAGNIFYING GLASS |
| --- | --- | --- | --- | --- | --- |
| EXAMPLE1-a | 0.0014 | 99.9977 | CUTTING OIL | 100 | GOOD |
| EXAMPLE1-b | 5.5362 | 94.4627 | SPINDLE OIL | 100 | GOOD |
| EXAMPLE1-c | 14.8721 | 85.1266 | WORKING OIL | 100 | GOOD |
| EXAMPLE1-d | 51.0235 | 48.9761 | WORKING OIL | 100 | GOOD |
| EXAMPLE1-e | 78.9737 | 21.0253 | SILICONE OIL | 100 | GOOD |
| EXAMPLE1-f | 98.9794 | 1.0195 | STRAIGHT SILICONE OIL | 100 | GOOD |
| EXAMPLE1-g | 10.5341 | 89.4651 | MODIFIED SILICONE OIL | 100 | GOOD |
| EXAMPLE1-h | 90.7102 | 9.2897 | CUTTING OIL | 100 | GOOD |
| EXAMPLE1-i | 99.9991 | 0.0006 | SPINDLE OIL | 100 | GOOD |
| EXAMPLE1-j | 97.0247 | 2.9745 | SILICONE OIL | 100 | GOOD |
| COMPARATIVE EXAMPLE 1-a | | | SILICONE OIL | 99.9 | NO GOOD (REMAINING) |
| COMPARATIVE EXAMPLE 1-b | | | LUBRICANT OIL | 99.9 | NO GOOD (REMAINING) |
| COMPARATIVE EXAMPLE 1-c | | | SILICONE OIL | 99.8 | NO GOOD (REMAINING) |
| COMPARATIVE EXAMPLE 1-d | | | LUBRICANT OIL | 99.8 | NO GOOD (REMAINING) |

Cutting oil: Lubcut B-35
Spindle oil: Pure Safety C-80
Working oil: Super Clean SC-41
Lubricant oil: Suniso 4GS
Silicone oil: SH-193
Straight silicone oil: KF-96
Modified silicone oil: MDX4-4159

Example 2

[Washing Test B]

Substantially the same test as in example 1-a (cutting oil (Lubcut B-35)) was performed except that an azeotropic-like composition formed of HCFO-1224xe (Z) (51.2354 GC %), HCFO-1233zd (E) (31.8451 GC %), HCFO-1224xe (E) (13.5412 GC %) and HCFO-1233zd (Z) (3.2741 GC %) was used. The post-washing composition ratio was: HCFO-1224xe (Z) (51.2349 GC %), HCFO-1233zd (E) (31.8422 GC %), HCFO-1224xe (E) (13.5913 GC %) and HCFO-1233zd (Z) (3.2743 GC %). The post-washing composition ratio was substantially the same as the initial composition ratio although 2 cc was volatilized. The oil removal ratio was 100%, and no remaining oil was observed by a magnifying glass. The azeotropic-like composition was determined as being good.

Example 3

<Washing Test C>

Substantially the same test as in example 2 (azeotropic-like composition formed of a mixture of the four types of substances) was performed using, instead of the cutting oil (Lubcut B-35), spindle oil (Pure Safety C-80), working oil (Super Clean SC-41), lubricant oil (Suniso 4GS), silicone oil (SH-193), straight silicone oil (KF-96), modified silicone oil (MDX4-4149). As in example 2, the oil removal ratio was 100%, and no remaining oil was observed by a magnifying glass. The azeotropic-like composition was determined as being good.

Example 4

<Washing Test D>

A SUS316 test piece was left for 1 week in a dusty workshop room. Nitrogen was blown to the test piece, and the test piece was observed by a microscope (magnification: 100× and 1000×). A great number of particles were observed. This test piece was subjected to ultrasonic washing for 30 seconds and steam washing for 30 seconds with an azeotropic-like composition according to the present invention formed of HCFO-1224xe (Z) (33 vol %)-HCFO-1224xe (E) (33 vol %)-HCFO-1233zd (E) (33 vol %)-HCFO-1233zd (Z) (1 vol %) (azeotropic-like composition formed of a mixture of the four types of substances). The test piece was naturally dried, and observed again by the microscope (magnification: 100× and 1000×). No remaining particle was observed. In a comparative example, substantially the same experiment was performed using HFC-365mfc. Remaining particles were observed.

Example 5

<Washing Test E>

Oil of each type shown in Table 9 below was applied to a metal mesh (60 mesh) formed of stainless steel, and the liquid was removed over 10 minutes. Then, the metal mesh was immersed in each of azeotropic-like compositions according to the present invention having the composition ratios shown in Table 8 for 5 seconds. The metal mesh was pulled up and dried. The mass thereof before and after the immersion was measured as in example 1 to find the oil removal ratio (examples 5-a through 5-c). In comparative examples, substantially the same test was performed using, instead of the azeotropic-like compositions, commercially available fluorine-based washing detergents, specifically, HFE-7100 ($CH_3OCF_2CF_2CF_2CF_3$ produced by 3M Japan Limited), HFC-365mfc ($CF_3CH_2CF_2CH_3$ produced by Nippon Solvay K.K.), and HCFC-225 (mixture of HCFC-225ca ($CF_3CF_2CHCl_2$) and HCFC-225cb ($CClF_2CF_2CHClF$) produced by Asahi Glass Co., Ltd.) (comparative examples 5-a through 5-c). The results are shown in Table 9 below.

TABLE 8

| | WASHING DETERGENT |
|---|---|
| EXAMPLE 5-a | HCFO-1224xe(E) (51.2354GC %), HCFO-1233zd(E) (31.8451GC %), HCFO-1224xe(Z) (13.5912GC %), HCFO-1233zd(Z) (3.2741GC %) |
| EXAMPLE 5-b | HCFO-1224xe(Z) (14.8835GC %), HCFO-1233zd(E) (85.1159GC %) |
| EXAMPLE 5-c | HCFO-1224xe(E) (89.4639GC %), HCFO-1233zd(E) (10.5354GC %) |
| COMPARATIVE EXAMPLE 5-a | HFE-7100 |
| COMPARATIVE EXAMPLE 5-b | HFC-365mfc |
| COMPARATIVE EXAMPLE 5-c | HCFC-225 |

TABLE 9

| | CUTTING OIL B-35 | CUTTING OIL C-80 | SPINDLE OIL PS-10 | WORKING OIL SC-41 | SILICONE OIL SH-193 |
|---|---|---|---|---|---|
| EXAMPLE 5-a | ○ | ○ | ○ | ○ | ○ |
| EXAMPLE 5-b | ○ | ○ | ○ | ○ | ○ |
| EXAMPLE 5-c | ○ | ○ | ○ | ○ | ○ |
| COMPARATIVE EXAMPLE 5-a | X | X | X | Δ | X |
| COMPARATIVE EXAMPLE 5-b | X | X | X | Δ | Δ |
| COMPARATIVE EXAMPLE 5-c | ○ | ○ | ○ | ○ | Δ |

In Table 9, "o" indicates that the oil removal ratio is 95% or greater and 100% or less. "Δ" indicates that the oil removal ratio is 80% or greater and less than 95%. "x" indicates that the oil removal ratio is 0% or greater and less than 80%.

Example 6

<Washing Test F>

An azeotropic-like composition (200 g) formed of HCFO-1224xe (Z) (80 mol %) and HCFO-1233zd (E) (20 mol %) was put into a compact ultrasonic washing device to wash a glass lens for 10 minutes. 10 minutes later, the temperature of the washing liquid was 17.5° C. This temperature represents the evaporation temperature of this azeotropic-like composition. The lens was dried with hot air and observed visually and by a magnifying glass. The lens had been washed in a good manner.

Example 7

<Washing Test G>

An azeotropic-like composition formed of HCFO-1224xe (E) (95 mol %) and HCFO-1233zd (Z) (5 mol %) was used to wash an acrylic plate by an ultrasonic washing device for 10 minutes. The acrylic plate was observed visually and by a magnifying glass. The surface of the acrylic plate was clean, and the acrylic plate was as lustrous as before being washed. In a comparative example, only HCFO-1233zd (Z) was used to wash an acrylic plate by an ultrasonic washing device for 10 minutes as in example 7. The acrylic plate was observed visually and by the magnifying glass. In the case where only HCFO-1233zd (Z) was used, the lust of the acrylic plate had been lost.

Hereinafter, solubility, with oil, of an azeotropic-like composition according to the present invention containing 2-chloro-1,3,3,3-tetrafluoropropene (HCFO-1224xe) and 1-chloro-3,3,3-trifluoropropene (HCFO-1233zd) will be described by way of examples.

Example 8

<Solubility Test with Oil>

HCFO-1224xe and HCFO-1233zd were mixed at various capacitance ratios to prepare azeotropic-like compositions A through H shown in Table 10 below. A glass vial (10 cc) was supplied with each azeotropic-like composition and oil as shown in Table 11, shaken 10 times and left still for 24 hours (examples 8-a through 8-x). In comparative examples, the same experiment was performed using commercially available fluorine-based solvents, instead of the azeotropic-like compositions (comparative examples 8-a through 8-f). The results of visual observation are shown in Table 11.

TABLE 10

| | COMPOSITION RATIO |
|---|---|
| AZEOTROPIC-LIKE COMPOSITION A | HCFO-1224xe(Z) (25 vol %)-HCFO-1233zd(E) (75 vol %) |
| AZEOTROPIC-LIKE COMPOSITION B | HCFO-1224xe(Z) (50 vol %)-HCFO-1233zd(E) (50 vol %) |
| AZEOTROPIC-LIKE COMPOSITION C | HCFO-1224xe(Z) (75 vol %)-HCFO-1233zd(E) (25 vol %) |
| AZEOTROPIC-LIKE COMPOSITION D | HCFO-1224xe(E) (25 vol %)-HCFO-1233zd(E) (75 vol %) |
| AZEOTROPIC-LIKE COMPOSITION E | HCFO-1224xe(E) (50 vol %)-HCFO-1233zd(E) (50 vol %) |
| AZEOTROPIC-LIKE COMPOSITION F | HCFO-1224xe(E) (75 vol %)-HCFO-1233zd(E) (25 vol %) |
| AZEOTROPIC-LIKE COMPOSITION G | HCFO-1224xe(E) (98 vol %)-HCFO-1233zd(E) (2 vol %) |
| AZEOTROPIC-LIKE COMPOSITION H | HCFO-1224xe(Z) (33 vol %)-HCFO-1224xe(E) (33 vol %)-HCFO-1233zd(E) (38 vol %)-HCFO-1233zd(Z) (1 vol %) |

TABLE 11

| | WASHING DETERGENT | TARGET OIL | CAPACITANCE RATIO OF COMPOSITION AND TARGET OIL | RESULTS AFTER LEFT STILL FOR 24 HOURS |
|---|---|---|---|---|
| EXAMPLE 8-a | AZEOTROPIC-LIKE COMPOSITION A | CUTTING OIL (LUBCUT B-35) | 9:1 | COMPLETELY MIXED |
| EXAMPLE 8-b | | | 5:5 | |
| EXAMPLE 8-c | | | 1:9 | |
| EXAMPLE 8-d | AZEOTROPIC-LIKE COMPOSITION B | SPINDLE OIL (PURE SAFETY C-80) | 9:1 | |
| EXAMPLE 8-e | | | 5:5 | |
| EXAMPLE 8-f | | | 1:9 | |
| EXAMPLE 8-g | AZEOTROPIC-LIKE COMPOSITION C | WORKING OIL (SUPER CLEAN SC-41) | 9:1 | |
| EXAMPLE 8-h | | | 5:5 | |
| EXAMPLE 8-i | | | 1:9 | |
| EXAMPLE 8-j | AZEOTROPIC-LIKE COMPOSITION D | LUBRICANT OIL (SUNISO 4GS) | 9:1 | |
| EXAMPLE 8-k | | | 5:5 | |
| EXAMPLE 8-l | | | 1:9 | |
| EXAMPLE 8-m | AZEOTROPIC-LIKE COMPOSITION E | SILICONE OIL (SH-193) | 9:1 | |
| EXAMPLE 8-n | | | 5:5 | |
| EXAMPLE 8-o | | | 1:9 | |
| EXAMPLE 8-p | AZEOTROPIC-LIKE COMPOSITION F | STRAIGHT SILICONE OIL (KF-96) | 9:1 | |
| EXAMPLE 8-q | | | 5:5 | |
| EXAMPLE 8-r | | | 1:9 | |
| EXAMPLE 8-s | AZEOTROPIC-LIKE COMPOSITION G | MODIFIED SILICONE OIL (DX4-4159) | 9:1 | |
| EXAMPLE 8-t | | | 5:5 | |
| EXAMPLE 8-u | | | 1:9 | |
| EXAMPLE 8-v | AZEOTROPIC-LIKE COMPOSITION H | LUBRICANT OIL (SUNISO | 9:1 | |
| EXAMPLE 8-w | | | 5:5 | |
| EXAMPLE 8-x | | | 1:9 | |

TABLE 11-continued

|  | WASHING DETERGENT | TARGET OIL | CAPACITANCE RATIO OF COMPOSITION AND TARGET OIL | RESULTS AFTER LEFT STILL FOR 24 HOURS |
|---|---|---|---|---|
| COMPARATIVE EXAMPLE 8-a | HFC-365mfc | 4GS) | 9:1 | SEPARATED INTO TWO LAYERS |
| COMPARATIVE EXAMPLE 8-b |  |  | 5:5 |  |
| COMPARATIVE EXAMPLE 8-c |  |  | 1:9 |  |
| COMPARATIVE EXAMPLE 8-d | HFC-43-10mee |  | 9:1 |  |
| COMPARATIVE EXAMPLE 8-e |  |  | 5:5 |  |
| COMPARATIVE EXAMPLE 8-f |  |  | 1:9 |  |

Performance, as a silicone solvent, of an azeotropic-like composition according to the present invention containing 2-chloro-1,3,3,3-tetrafluoropropene (HCFO-1224xe) and 1-chloro-3,3,3-trifluoropropene (HCFO-1233zd) will be described by way of examples.

Example 9

<Test on the State of Application and the Ease of Drying>

Azeotropic-like compound H used in example 8 described above and silicone oil shown in Table 12 were mixed at a capacitance ratio of 95:5. The mixture was made uniform quickly. The resultant silicone solution did not change in properties, for example, was not separated into two layers, even after being stored for 1 month. A mirror-finished disc formed of SUS316 was immersed in the silicone solution, and dried by use of a spin coater. Specifically, the disc was rotated for 30 seconds at 1000 rpm. The ease of drying and the state of the formed film are shown in Table 12.

TABLE 12

|  | SILICONE OIL | EASE OF DRYING | STATE OF SILICONE FILM |
|---|---|---|---|
| EXAMPLE 9-a | SH-193 | GOOD | GOOD |
| EXAMPLE 9-b | KF96 | GOOD | GOOD |
| EXAMPLE 9-c | MDX4-4159 | GOOD | GOOD |

Performance, as a foaming agent, of an azeotropic-like composition according to the present invention containing 2-chloro-1,3,3,3-tetrafluoropropene (HCFO-1224xe) and 1-chloro-3,3,3-trifluoropropene (HCFO-1233zd) will be described by way of examples.

Example 10

<Foaming Test>

A premix was having the following composition ratio was prepared.

Ester-based polyol (produced by Toho Rika Tokyo K.K.; OH value: 314 mgKOH/g): 50 parts by mass Polyether-based polyol (produced by Sumika Bayer Urethane K.K.; OH value: 467 mgKOH/g): 50 parts by mass Foam stabilizer (SF2937F produced by Dow Corning Toray Co., Ltd.): 1.5 parts by mass Foam stabilizer (TFA-4200 produced by GE Toshiba Silicone K.K.): 0.5 parts by mass Potassium acetate: 0.5 parts by mass Catalyst (PC-41 produced by Air Products Limited): 1.5 parts by mass Ion exchanged water: 2 parts by mass Foaming agent (HCFO-1224xe (Z) (33 vol %)-HCFO-1224xe (E) (33 vol %)-HCFO-1233zd (E) (33 vol %)-HCFO-1233zd (Z) (1 vol %)): 35 parts by mass The above-described premix and 199 parts by mass of isocyanate (Cosmonate M-200 produced by Mitsui Takeda Chemical K.K.) were mixed by stirring. As a result, a foamed body having a gelation time of 18 seconds and having a superb external appearance was obtained. A core thereof was removed and observed visually. A fine and uniform cell had been formed. The heat transfer coefficient of the foamed body measured by a heat transfer coefficient meter (TCA-8 produced by Anacon) in conformity to JIS A-1412 was 20.10 mW/mK.

In a comparative example, the same experiment as in embodiment 10 was performed except that HCFO-1233zd (E) (99.9999 GC %) was used as the foaming agent. As a result, a foamed body having a gelation time of 18 seconds and having a superb external appearance was obtained. A core thereof was removed and observed visually. A fine and uniform cell had been formed. The heat transfer coefficient of the foamed body measured by a heat transfer coefficient meter (TCA-8 produced by Anacon) in conformity to JIS A-1412 was 20.90 mW/mK.

The flash point of an azeotropic-like composition according to the present invention containing 2-chloro-1,3,3,3-tetrafluoropropene (HCFO-1224xe) and 1-chloro-3,3,3-trifluoropropene (HCFO-1233zd) will be described by way of examples.

Example 11

<Measurement of the Flash Point>

The flash point of azeotropic-like compositions having the composition ratios shown in Table 13 below was measured (with tag-closed flash point measurement device: atg-8 produced by Tanaka). The results is shown in Table 13.

TABLE 13

| EXAMPLE | COMPOSITION RATIO |  | FLASH POINT |
|---|---|---|---|
| 11-a | AZEOTROPIC-LIKE COMPOSITION A | HCFO-1224xe(Z) (25 vol %)-HCFO-1233zd(E) (75 vol %) | NONE |

TABLE 13-continued

| EXAMPLE | COMPOSITION RATIO | | FLASH POINT |
|---|---|---|---|
| 11-b | AZEOTROPIC-LIKE COMPOSITION B | HCFO-1224xe(Z) (50 vol %)- HCFO-1233zd(E) (50 vol %) | NONE |
| 11-c | AZEOTROPIC-LIKE COMPOSITION C | HCFO-1224xe(Z) (75 vol %)- HCFO-1233zd(E) (25 vol %) | NONE |
| 11-d | AZEOTROPIC-LIKE COMPOSITION D | HCFO-1224xe(Z) (25 vol %)- HCFO-1233zd(E) (75 vol %) | NONE |
| 11-e | AZEOTROPIC-LIKE COMPOSITION E | HCFO-1224xe(E) (50 vol %)- HCFO-1233zd(E) (50 vol %) | NONE |
| 11-f | AZEOTROPIC-LIKE COMPOSITION F | HCFO-1224xe(E) (75 vol %)- HCFO-1233zd(E) (25 vol %) | NONE |
| 11-g | AZEOTROPIC-LIKE COMPOSITION G | HCFO-1224xe(E) (98 vol %)- HCFO-1233zd(E) (2 vol %) | NONE |
| 11-h | AZEOTROPIC-LIKE COMPOSITION H | HCFO-1224xe(Z) (33 vol %)- HCFO-1224xe(E) (33 vol %)- HCFO-1233zd(E) (38 vol %)- HCFO-1233zd(Z) (1 vol %) | NONE |

From the results of examples 1 through 11, it is seen that an azeotropic-like composition according to the present invention containing 2-chloro-1,3,3,3-tetrafluoropropene (HCFO-1224xe) and 1-chloro-3,3,3-trifluoropropene (HCFO-1233zd) is superb as a washing detergent, a solvent and a silicone solvent that are non-flammable, have little influence on the environment, and have substantially the same composition ratio in the liquid phase and the gas phase, and is useful as a material of a foaming agent having the above-described properties.

Hereinafter, performance, as a heat transfer medium, of an azeotropic-like composition according to the present invention containing 2-chloro-1,3,3,3-tetrafluoropropene (HCFO-1224xe) and 1-chloro-3,3,3-trifluoropropene (HCFO-1233zd) will be described by way of examples.

Example 12

<Heat Transfer Medium Containing HCFO-1224xe (Z) and HCFO-1233zd (E)>

In a performance evaluation on a refrigeration cycle system conducted using, as a heat transfer medium, an azeotropic-like composition containing cis-2-chloro-1,3,3,3-tetrafluoropropene (HCFO-1224xe (Z)) and trans-1-chloro-3,3,3-trifluoropropene (HCFO-1233zd (E)), the coefficient of performance was calculated under the conditions shown in Table 14. The property values of the heat transfer medium was found in conformity to REFPROP ver. 9.0 issued by National Institute of Standards and Technology (NIST) of the United States. Table 14 shows refrigeration cycle system calculation conditions 1.

TABLE 14

| REFRIGERATION CYCLE SYSTEM CALCULATION CONDITIONS 1 | | | |
|---|---|---|---|
| EVAPORATION TEMPERATURE | $T_{EVA}$ | 2 | [° C.] |
| CONDENSATION TEMPERATURE | $T_{CON}$ | 40 | [° C.] |
| SUPERHEATING DEGREE | $T_{sh}$ | 10 | [K] |
| SUPERCOOLING DEGREE | $T_{sc}$ | 0 | [K] |
| COMPRESSOR EFFICIENCY | $\eta$ | 0.7 | [—] |

The refrigeration cycle system calculation conditions 1 shown above are set with an assumption that 7° C. cold water is generated in an evaporator by heat exchange of the heat transfer medium and heat source water.

For calculating the coefficient of performance of the refrigeration cycle system, i.e., $COP_R$, the following conditions were set.

(A) The compression process of the compressor is isentropic compression.

(B) The throttle-expansion process of the expansion valve is isenthalpic expansion.

(C) The heat loss and the pressure loss in the pipe and the heat exchanger are ignored.

(D) The compressor efficiency $\eta$ is 0.7.

Hereinafter, the expressions used to calculate the coefficient of performance of the refrigeration cycle system $(COP_R)$ will be described in detail. The heat quantity absorbed from the evaporator, i.e., $Q_{EVA}$, is:

$$Q_{EVA} = G \times (h_1 - h_4) \quad (1).$$

The heat quantity released from the condenser, i.e., $Q_{CON}$, is:

$$Q_{CON} = G \times (h_2 - h_3) \quad (2).$$

Where the post-isentropic compression enthalpy of the heat transfer medium at the exit of the compressor is represented by $h_{2th}$, the enthalpy of the heat transfer medium at the exit of the compressor in consideration of the compressor efficiency, i.e., $h_2$, is:

$$h_2 = h_1 + (h_{2th} - h_1)\eta \quad (3).$$

The work W added by the compressor at the time of compressing the steam of the heat transfer medium is:

$$W = G \times (h_2 - h_1) \quad (4).$$

The coefficient of performance of the refrigeration cycle system $(COP_R)$ is:

$$COP_R = Q_{EVA}/W = (h_1 - h_4)/(h_2 - h_1) \quad (5).$$

The coefficient of performance of the high temperature heat pump cycle system, i.e., $COP_H$, is:

$$COP_H = Q_{CON}/W = (h_2 - h_3)/(h_2 - h_1) \quad (6).$$

Now, the expressions used to calculate the volume capacity (CAP) of the heat transfer medium will be described in detail. The steam density of the heat transfer medium at the suction opening of the compressor is $\rho_2$. The heat quantity absorbed from the evaporator is $Q_{EVA}$. Therefore, the volume capacity of the refrigeration cycle system, i.e., $CAP_R$, is:

$$CAP_R = \rho_2 \times Q_{EVA} = \rho_2 \times (h_1 - h_4) \quad (7).$$

The volume capacity of the high temperature heat pump cycle system, i.e., $CAP_H$, is:

$$CAP_H = \rho_2 \times Q_{CON} = \rho_2 \times (h_2 - h_3) \quad (8).$$

In expressions (1) through (8) above, the symbols represent the following.

G: Circulation quantity of the heat transfer composition
W: Compression work
$Q_{EVA}$: Input heat quantity
$Q_{CON}$: Released heat quantity
$COP_R$: Coefficient of performance (cooling)
$COP_H$: Coefficient of performance (heating)
$CAP_R$: Volume capacity (cooling)
$CAP_H$: Volume capacity (heating)
h: Specific enthalpy
1, 2, 3, 4: Cycle point
2th: Cycle point after the isentropic compression Regarding example 12 (azeotropic-like composition containing HCFO-1224xe (Z) and HCFO-1233zd (E)), FIG. 7 shows a P-h diagram (in the azeotropic-like composition, the mass ratio is HCFO-1224xe (Z)/HCFO-1233zd (E)=90/10).

Figure 7:
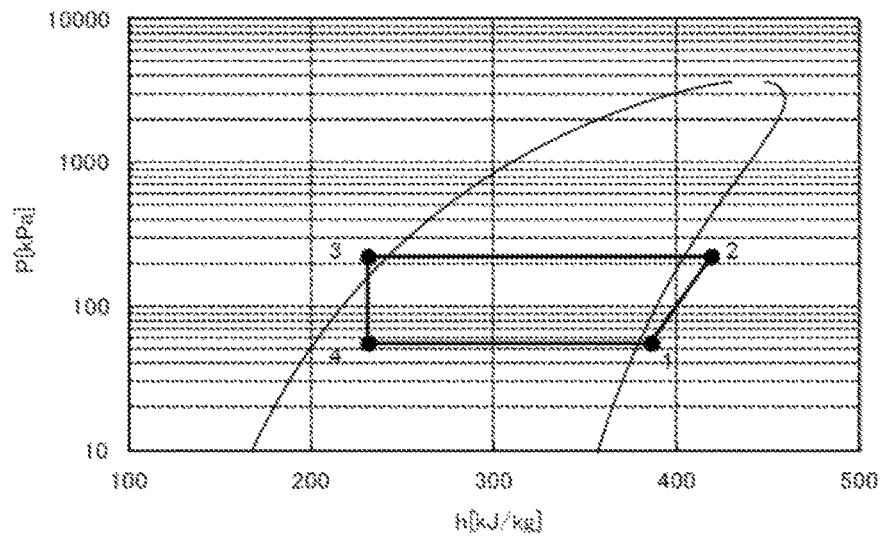
FIG. 7 is a P-h diagram of an azeotropic-like composition according to the present invention containing cis-2-chloro-1,3,3,3-tetrafluoropropene (HCFO-1224xe (Z)) and trans-1-chloro-3,3,3-trifluoropropene (HCFO-1233zd (E)).

In FIG. 7, cycle points 1, 2, 3 and 4 represent the refrigeration cycle system calculation conditions 1.

Comparative Example 12

2,2-dichloro-1,1,1-trifluoroethane 2,2-dichloro-1,1,1-trifluoroethane (HCFC-123) is non-flammable and has an allowable concentration of 10 ppm. HCFC-123 has a boiling point of 27.8° C. at an atmospheric pressure, an atmospheric life of 1.3 years, a global warming potential (GWP) of 77 (IPCC 4th Assessment Report, 2007), and an ozone depletion potential (ODP) of 0.02.

Figure 8:
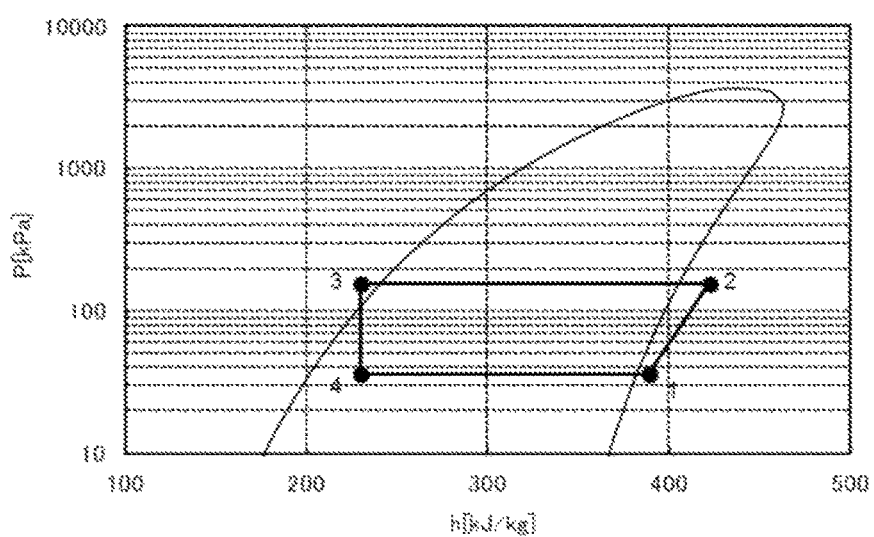
FIG. 8 is a P-h diagram of 2,2-dichloro-1,1,1-trifluoroethane (HCFC-123).

In a performance evaluation on a refrigeration cycle system conducted using 2,2-dichloro-1,1,1-trifluoroethane (HCFC-123) as the heat transfer medium, instead of the azeotropic-like composition according to the present invention in example 12, the coefficient of performance was calculated under the conditions shown in Table 14. FIG. 8 is a P-h diagram in comparative example 12 (HCFC-123).

Table 15 shows the calculation results of the coefficient of performance of the refrigeration cycle system ($COP_R$) in example 12 and comparative example 12.

In Table 15, the values of a first component and a second component of the azeotropic-like composition according to the present invention used in example 12 are represented with mass percent. The first component of the azeotropic-like composition is cis-2-chloro-1,3,3,3-tetrafluoropropene (HCFO-1224xe (Z)), and the second component is trans-1-chloro-3,3,3-trifluoropropene (HCFO-1233zd (E)). In Table 15, the relative $COP_R$ value and the relative $CAP_R$ value in example 12 were respectively calculated with the $COP_R$ value and the $CAP_R$ value in comparative example 12 being 1.00.

that of the system for HCFC-123. The heat transfer medium containing the azeotropic-like composition according to the present invention has been found to be equivalent to HCFC-123 in the driving pressure, pressure ratio and pressure difference, and is seen as being usable as a substitute composition having a higher environmental compatibility.

Example 13

<Heat Transfer Medium Containing HCFO-1224xe (Z) and HCFO-1233zd (E)>

In a performance evaluation on a high temperature heat pump cycle system conducted using, as a heat transfer medium, an azeotropic-like composition containing cis-2-chloro-1,3,3,3-tetrafluoropropene (HCFO-1224xe (Z)) and trans-1-chloro-3,3,3-trifluoropropene (HCFO-1233zd (E)), the coefficient of performance was calculated under the conditions shown in Table 16. The property values of the heat transfer medium was found in conformity to REFPROP ver. 9.0 issued by National Institute of Standards and Technology (NIST) of the United States. Table 16 shows high temperature heat pump cycle system calculation conditions 2.

TABLE 16

HIGH TEMPERATURE HEAT PUMP CYCLE SYSTEM CALCULATION CONDITIONS 2

| EVAPORATION TEMPERATURE | $T_{EVA}$ | 30 [° C.] |
|---|---|---|
| CONDENSATION TEMPERATURE | $T_{CON}$ | 80 [° C.] |
| SUPERHEATING DEGREE | $T_{sh}$ | 10 [K] |
| SUPERCOOLING DEGREE | $T_{sc}$ | 10 [K] |
| COMPRESSOR EFFICIENCY | η | 0.7 [—] |

TABLE 15

<Example 12: the azeotropic-like composition including HCFO-1224xe (Z) and HCFO-1233zd (E), calculation conditions 1>

| 1ST COMPONENT | 2ND COMPONENT | $T_2$ [° C.] | $P_{EVA}$ [kPa] | $P_{CON}$ [kPa] | PRESSURE RATIO [—] | RELATIVE $COP_R$ [—] | RELATIVE $CAP_R$ [—] |
|---|---|---|---|---|---|---|---|
| 99 | 1 | 58.8 | 55 | 222 | 4.01 | 1.00 | 1.46 |
| 95 | 5 | 58.9 | 55 | 222 | 4.01 | 1.00 | 1.46 |
| 90 | 10 | 58.9 | 56 | 222 | 4.00 | 1.00 | 1.46 |
| 80 | 20 | 59.1 | 55 | 222 | 4.00 | 1.00 | 1.45 |
| 70 | 30 | 59.4 | 55 | 221 | 4.01 | 1.00 | 1.44 |
| 60 | 40 | 59.7 | 55 | 220 | 4.02 | 1.00 | 1.43 |
| 50 | 50 | 60.0 | 54 | 219 | 4.04 | 1.00 | 1.43 |
| 40 | 60 | 60.3 | 54 | 218 | 4.06 | 0.99 | 1.42 |
| 30 | 70 | 60.6 | 53 | 217 | 4.07 | 0.99 | 1.41 |
| 20 | 80 | 61.0 | 53 | 216 | 4.09 | 0.99 | 1.41 |
| 10 | 90 | 61.3 | 53 | 216 | 4.11 | 0.99 | 1.40 |
| 5 | 95 | 61.4 | 52 | 216 | 4.12 | 0.99 | 1.40 |
| 1 | 99 | 61.6 | 52 | 216 | 4.12 | 0.99 | 1.40 |
| COMPARATIVE EXAMPLE 12 | | 63.4 | 36 | 154 | 4.32 | 1.00 | 1.00 |

It is seen from Table 15 that the azeotropic-like composition according to the present invention has a coefficient of performance ($COP_R$) equivalent to that of 2,2-dichloro-1,1,1-trifluoroethane (HCFC-123), which is conventionally used. It has also been found that the volume capacity of the azeotropic-like composition according to the present invention is higher than that of HCFC-123 by 40 to 46%. These results indicate that a refrigeration cycle system for 2-chloro-1,3,3,3-tetrafluoropropene that has a cooling capability equivalent to that of a refrigeration cycle system for HCFC-123 may be designed with a total size smaller than The high temperature heat pump cycle system calculation conditions 2 are set with an assumption that 70° C. hot water is generated in a condenser by heat exchange of the heat transfer medium and heat source water.

For calculating the coefficient of performance of the high temperature heat pump cycle system ($COP_H$), the following conditions were set.

(A) The compression process of the compressor is isentropic compression.

(B) The throttle-expansion process of the expansion valve is isenthalpic expansion.

(C) The heat loss and the pressure loss in the pipe and the heat exchanger are ignored.

(D) The compressor efficiency η is 0.7.

Figure 9:
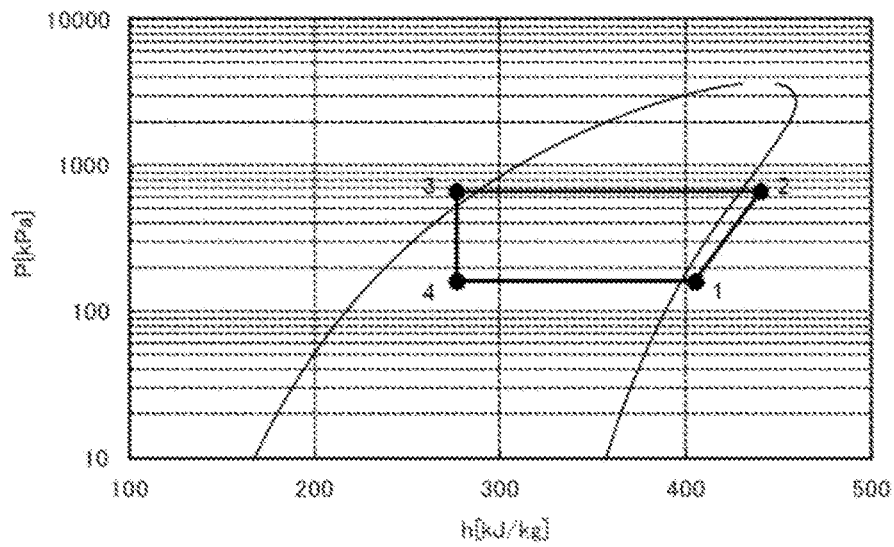
FIG. 9 is a P-h diagram of an azeotropic-like composition according to the present invention containing cis-2-chloro-1,3,3,3-tetrafluoropropene (HCFO-1224xe (Z)) and trans-1-chloro-3,3,3-trifluoropropene (HCFO-1233zd (E)).

Regarding example 13 (azeotropic-like composition containing HCFO-1224xe (Z) and HCFO-1233zd (E)), FIG. 9 shows a P-h diagram (in the azeotropic-like composition, the mass ratio is HCFO-1224xe (Z)/HCFO-1233zd (E)=90/10). In FIG. 9, cycle points 1, 2, 3 and 4 represent the high temperature heat pump cycle system calculation conditions 2.

Comparative Example 13

2,2-dichloro-1,1,1-trifluoroethane

Figure 10:
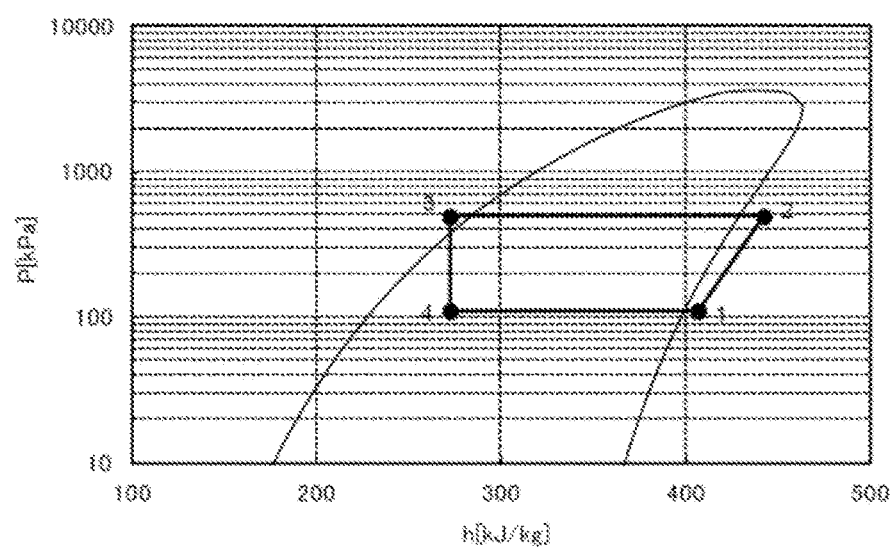
FIG. 10 is a P-h diagram of 2,2-dichloro-1,1,1-trifluoroethane (HCFC-123).

In a performance evaluation on a high temperature heat pump cycle system conducted using 2,2-dichloro-1,1,1-trifluoroethane (HCFC-123) as the heat transfer medium, instead of the heat transfer medium according to the present invention in example 13, the coefficient of performance was calculated under the conditions shown in Table 16. FIG. 10 is a P-h diagram in comparative example 13 (HCFC-123).

Table 17 shows the calculation results of the coefficient of performance of the high temperature heat pump cycle system ($COP_H$) in example 13 and comparative example 13.

In Table 17, the values of a first component and a second component of the azeotropic-like composition according to the present invention used in example 13 are represented with mass percent. The first component of the azeotropic-like composition is cis-2-chloro-1,3,3,3-tetrafluoropropene (HCFO-1224xe (Z)), and the second component is trans-1-chloro-3,3,3-trifluoropropene (HCFO-1233zd (E)). In Table 17, the relative $COP_H$ value and the relative $CAP_H$ value in example 13 were respectively calculated with the $COP_H$ value and the $CAP_H$ value in comparative example 13 being 1.00.

has a heating capability equivalent to that of a high temperature heat pump cycle system for HCFC-123 may be designed with a total size smaller than that of the system for HCFC-123. The heat transfer medium containing the azeotropic-like composition according to the present invention has been found to be equivalent to HCFC-123 in the driving pressure, pressure ratio and pressure difference, and is seen as being usable as a substitute composition having a higher environmental compatibility.

Example 14

<Heat Transfer Medium Containing HCFO-1224xe (Z) and HCFO-1233zd (E)>

In a performance evaluation on a high temperature heat pump cycle system conducted using, as a heat transfer medium, an azeotropic-like composition containing cis-2-chloro-1,3,3,3-tetrafluoropropene (HCFO-1224xe (Z)) and trans-1-chloro-3,3,3-trifluoropropene (HCFO-1233zd (E)), the coefficient of performance was calculated under the conditions shown in Table 18. Table 18 shows high temperature heat pump cycle system calculation conditions 3.

TABLE 18

| HIGH TEMPERATURE HEAT PUMP CYCLE SYSTEM CALCULATION CONDITIONS 3 | | | |
|---|---|---|---|
| EVAPORATION TEMPERATURE | $T_{EVA}$ | 70 | [° C.] |
| CONDENSATION TEMPERATURE | $T_{CON}$ | 130 | [° C.] |
| SUPERHEATING DEGREE | $T_{sh}$ | 10 | [K] |
| SUPERCOOLING DEGREE | $T_{sc}$ | 10 | [K] |
| COMPRESSOR EFFICIENCY | η | 0.7 | [—] |

The high temperature heat pump cycle system calculation conditions 3 are set with an assumption that 120° C. pres-

TABLE 17

<Example 13: the azeotropic-like composition including HCFO-1224xe (Z) and HCFO-1233zd (E), calculation conditions 2>

| 1ST COMPONENT | 2ND COMPONENT | $T_2$ [° C.] | $P_{EVA}$ [kPa] | $P_{CON}$ [kPa] | PRESSURE RATIO [—] | RELATIVE $COP_R$ [—] | RELATIVE $CAP_R$ [—] |
|---|---|---|---|---|---|---|---|
| 99 | 1 | 92.2 | 160 | 673 | 4.20 | 0.98 | 1.36 |
| 95 | 5 | 92.1 | 160 | 672 | 4.19 | 0.99 | 1.36 |
| 90 | 10 | 92.2 | 160 | 670 | 4.18 | 0.99 | 1.36 |
| 80 | 20 | 92.6 | 160 | 668 | 4.17 | 0.99 | 1.36 |
| 70 | 30 | 92.9 | 159 | 665 | 4.18 | 0.99 | 1.35 |
| 60 | 40 | 93.3 | 158 | 662 | 4.18 | 0.99 | 1.35 |
| 50 | 50 | 93.8 | 157 | 660 | 4.19 | 0.99 | 1.34 |
| 40 | 60 | 94.2 | 157 | 659 | 4.21 | 0.99 | 1.34 |
| 30 | 70 | 94.6 | 156 | 658 | 4.22 | 0.99 | 1.34 |
| 20 | 80 | 95.0 | 155 | 657 | 4.23 | 0.99 | 1.34 |
| 10 | 90 | 95.5 | 155 | 657 | 4.24 | 0.99 | 1.33 |
| 5 | 95 | 95.7 | 155 | 657 | 4.25 | 0.99 | 1.34 |
| 1 | 99 | 95.8 | 155 | 658 | 4.25 | 0.99 | 1.34 |
| COMPARATIVE EXAMPLE 13 | | 96.8 | 110 | 489 | 4.46 | 1.00 | 1.00 |

It is seen from Table 17 that the azeotropic-like composition according to the present invention has a coefficient of performance ($COP_H$) equivalent to that of 2,2-dichloro-1,1,1-trifluoroethane (HCFC-123), which is conventionally used. It has also been found that the volume capacity ($CAP_H$) of the heat transfer medium according to the present invention is higher than that of HCFC-123 by 33 to 36%. These results indicate that a high temperature heat pump cycle system for 2-chloro-1,3,3,3-tetrafluoropropene that surized hot water is generated in a condenser by heat exchange of the heat transfer medium and heat source water.

Figure 11:
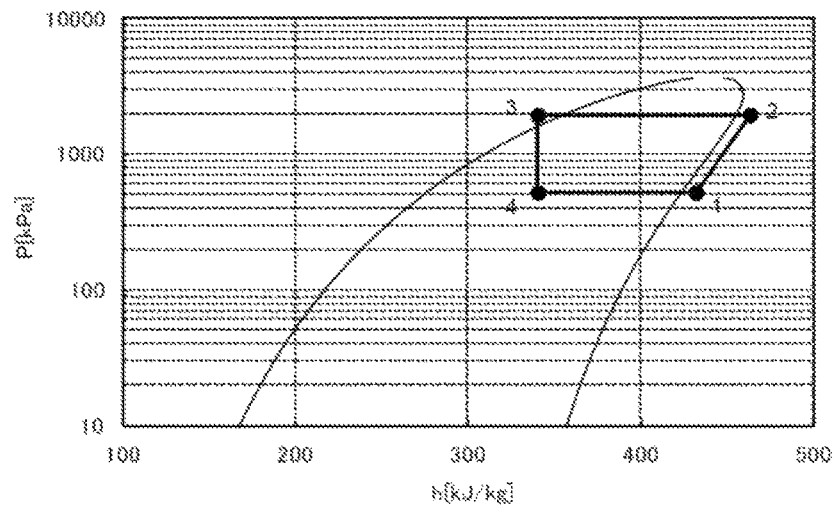
FIG. 11 is a P-h diagram of an azeotropic-like composition according to the present invention containing cis-2-chloro-1,3,3,3-tetrafluoropropene (HCFO-1224xe (Z)) and trans-1-chloro-3,3,3-trifluoropropene (HCFO-1233zd (E)).

Regarding example 14 (azeotropic-like composition containing HCFO-1224xe (Z) and HCFO-1233zd (E)), FIG. 11 shows a P-h diagram (the mass ratio is HCFO-1224xe (Z)/HCFO-1233zd (E)=90/10). In FIG. 11, cycle points 1, 2, 3 and 4 represent the high temperature heat pump cycle system calculation conditions 3.

Comparative Example 14

2,2-dichloro-1,1,1-trifluoroethane

Figure 12:
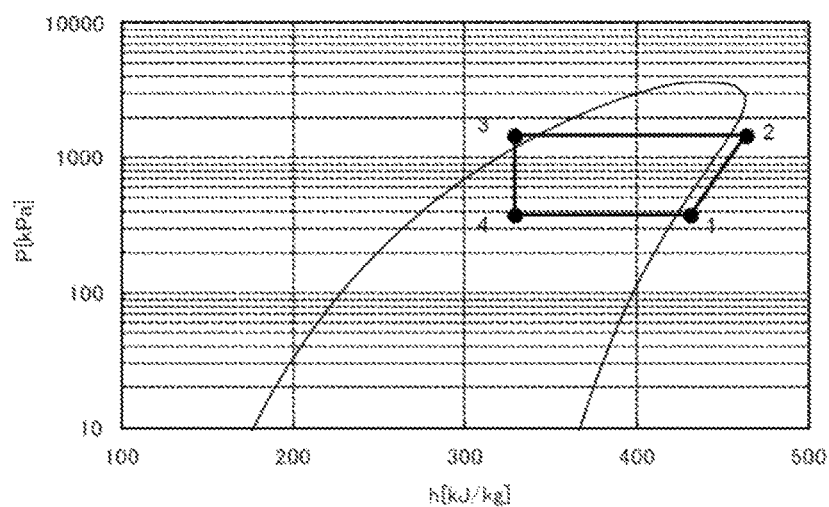
FIG. 12 is a P-h diagram of 2,2-dichloro-1,1,1-trifluoroethane (HCFC-123).

In a performance evaluation on a high temperature heat pump cycle system conducted using 2,2-dichloro-1,1,1-trifluoroethane (HCFC-123) as the heat transfer medium, instead of the heat transfer medium according to the present invention in example 14, the coefficient of performance was calculated under the conditions shown in Table 18. FIG. 12 is a P-h diagram in comparative example 14 (HCFC-123).

Table 19 shows the calculation results of the coefficient of performance of the high temperature heat pump cycle system ($COP_H$) in example 14 and comparative example 14.

In Table 19, the values of a first component and a second component of the azeotropic-like composition according to the present invention used in example 14 are represented with mass percent. The first component of the azeotropic-like composition is cis-2-chloro-1,3,3,3-tetrafluoropropene (HCFO-1224xe (Z)), and the second component is trans-1-chloro-3,3,3-trifluoropropene (HCFO-1233zd (E)). In Table 19, the relative $COP_H$ value and the relative $CAP_H$ value in example 14 were respectively calculated with the $COP_H$ value and the $CAP_H$ value in comparative example 14 being 1.00.

TABLE 19

<Example 14: the azeotropic-like composition including HCFO-1224xe (Z) and HCFO-1233zd (E), calculation conditions 3>

| 1ST COM-PONENT | 2ND COM-PONENT | $T_2$ [° C.] | $P_{EVA}$ [kPa] | $P_{CON}$ [kPa] | PRESSURE RATIO [—] | RELATIVE $COP_R$ [—] | RELATIVE $CAP_R$ [—] |
|---|---|---|---|---|---|---|---|
| 99 | 1 | 137.1 | 523 | 1950 | 3.73 | 0.95 | 1.24 |
| 95 | 5 | 137.2 | 523 | 1945 | 3.72 | 0.95 | 1.24 |
| 90 | 10 | 137.3 | 522 | 1938 | 3.71 | 0.95 | 1.23 |
| 80 | 20 | 137.7 | 520 | 1927 | 3.71 | 0.95 | 1.23 |
| 70 | 30 | 138.0 | 518 | 1918 | 3.70 | 0.95 | 1.23 |
| 60 | 40 | 138.5 | 516 | 1912 | 3.71 | 0.96 | 1.23 |
| 50 | 50 | 138.9 | 514 | 1907 | 3.71 | 0.96 | 1.23 |
| 40 | 60 | 139.4 | 513 | 1904 | 3.71 | 0.96 | 1.23 |
| 30 | 70 | 139.8 | 512 | 1903 | 3.72 | 0.96 | 1.24 |
| 20 | 80 | 140.2 | 511 | 1903 | 3.72 | 0.96 | 1.24 |
| 10 | 90 | 140.6 | 511 | 1905 | 3.73 | 0.96 | 1.24 |
| 5 | 95 | 140.8 | 511 | 1906 | 3.73 | 0.69 | 1.25 |
| 1 | 99 | 141.0 | 511 | 1907 | 3.73 | 0.96 | 1.25 |
| COMPARATIVE EXAMPLE 14 | | 139.9 | 377 | 1458 | 3.86 | 1.00 | 1.00 |

It is seen from Table 19 that the heat transfer medium according to the present invention has a coefficient of performance ($COP_H$) equivalent to that of 2,2-dichloro-1,1,1-trifluoroethane (HCFC-123), which is conventionally used. It has also been found that the volume capacity ($CAP_H$) of the heat transfer medium according to the present invention is higher than that of HCFC-123 by 23 to 25%. These results indicate that a high temperature heat pump cycle system for 2-chloro-1,3,3,3-tetrafluoropropene that has a heating capability equivalent to that of a high temperature heat pump cycle system for HCFC-123 may be designed with a total size smaller than that of the system for HCFC-123. The heat transfer medium containing the azeotropic-like composition according to the present invention has been found to be equivalent to HCFC-123 in the driving pressure, pressure ratio and pressure difference, and is seen as being usable as a substitute composition having a higher environmental compatibility.

Example 15

<Heat Transfer Medium Containing HCFO-1224xe (Z) and HCFO-1233zd (E)>

In a performance evaluation on an organic rankine cycle system conducted using, as a heat transfer medium (working fluid), an azeotropic-like composition containing cis-2-chloro-1,3,3,3-tetrafluoropropene (HCFO-1224xe (Z)) and trans-1-chloro-3,3,3-trifluoropropene (HCFO-1233zd (E)), the electric energy generation cycle efficiency and the expansion device size parameter were calculated under the conditions shown in Table 20. Table 20 shows organic rankine cycle system calculation conditions 4.

TABLE 20

ORGANIC RANKINE CYCLE SYSTEM CALCULATION CONDITIONS 4

| SUPPLIED HEAT QUANTITY | $Q_{EVA}$ | 1000 [kw] |
|---|---|---|
| EVAPORATION TEMPERATURE | $T_{EVA}$ | 80 [° C.] |
| CONDENSATION TEMPERATURE | $T_{CON}$ | 40 [° C.] |
| EXPANSION DEVICE EFFICIENCY | $\eta_T$ | 0.80 [—] |

TABLE 20-continued

ORGANIC RANKINE CYCLE SYSTEM CALCULATION CONDITIONS 4

| PUMP EFFICIENCY | $\eta_P$ | 0.75 [—] |
|---|---|---|
| ELECTRIC ENERGY GENERATOR EFFICIENCY | $\eta_G$ | 0.95 [—] |

The organic rankine cycle system calculation conditions 4 are set with an assumption that the temperature of the heat source water to be supplied to the evaporator is 90° C. and that the temperature of the cooling water to be supplied to the condenser is 30° C.

For calculating the electric energy generation cycle efficiency ($\eta_{cycle}$) and the expansion device size parameter (SP) of the organic rankine cycle system, the following conditions were set.

(A) The ideal expansion process of the rankine cycle is isentropic expansion, and the adiabatic efficiency $\eta_T$ of the expansion device is introduced in consideration of the loss in the actual device.

(B) The loss in the electric energy generator caused by the expansion device is considered in terms of the electric energy generation efficiency $\eta_G$.

(C) The circulation pump is driven by the generated electric energy, and the pump efficiency $\eta_P$ including the motor efficiency is introduced. The pump is of a canned type, and the loss is incorporated into the cycle as heat.

(D) The circulation pump power by the bearing lubricant oil is tiny and thus is ignored.

(E) The heat loss and the pressure loss in the pipe are ignored.

(F) The working fluid at the exit of the evaporator is saturated steam.

(G) The working fluid at the exit of the condenser is saturated liquid.

Hereinafter, the basic expressions used to calculate the electric energy generation cycle efficiency ($\eta_{cycle}$) of the organic rankine cycle system will be described in detail. As the basic expressions, the calculation expressions described in Ebara Engineering Review No. 211 (2006-4), "Development of a Power Generation Unit Driven by Waste Heat (Study on Working Fluids and Expansion Turbines)" (page 11) were used.

The theoretically generated power $L_{Tth}$ in the expansion device by the circulating quantity G of the working fluid is:

$$L_{Tth} = G \times (h_1 - h_{2th}) \quad (9).$$

The generated power $L_T$ in consideration of the expansion device efficiency $\eta_T$ is:

$$L_T = L_{Tth} \times \eta_T = G \times (h_1 - h_2) \quad (10).$$

The generated electric energy quantity $E_G$ in consideration of the electric energy generator efficiency $\eta G$ is:

$$E_G = L_T \times \eta_G \quad (11).$$

The circulation pump transmits the working fluid at the exit of the condenser with the condenser pressure $P_C$ to the evaporator with the evaporator pressure $P_E$ which is higher than the condenser pressure $P_C$, and the theoretically required power $L_{Pth}$ thereof is:

$$L_{Pth} = (P_E - P_C) \times G/\rho_3 \quad (12).$$

The required electric energy $E_P$ in consideration of the pump efficiency TIP is:

$$E_P = L_{Pth}/\eta_P = G \times (h_4 - h_3) \quad (13).$$

The effective quantity $E_{cycle}$ of generated electric energy is:

$$E_{cycle} = E_G - E_P \quad (14).$$

The heat quantity $Q_E$ supplied to the evaporator is:

$$Q_E = G \times (h_1 - h_4) = G \times (h_1 - h_3) - (P_E - P_C) \times G/(\rho_3 \times \eta_P) \quad (15).$$

The efficiency of the electric energy generation cycle is:

$$\eta_{cycle} = (E_G - E_P) \times 100/Q_E \quad (16).$$

Now, the expansion device size parameter (SP) will be described in detail. The calculation expressions described in Energy 2012, Vol. 38, pp. 136-143 were used.

When the circulation quantity of the working fluid is G, the volumetric flow rate $V_{2th}$ of the working fluid at the exit of the expansion device at the isentropic expansion is:

$$V_{2th} = G/\rho_{2th} \quad (17).$$

The theoretical adiabatic heat drop $\Delta H_{th}$ in the expansion device is:

$$\Delta H_{th} = h_1 - h_{2th} \quad (18).$$

The expansion device size parameter (SP) is:

$$SP = (V_{2th})^{0.5}/(\Delta H_{th})^{0.25} \quad (19).$$

In expressions (9) through (19) above, the symbols represent the following.

Figure 13:
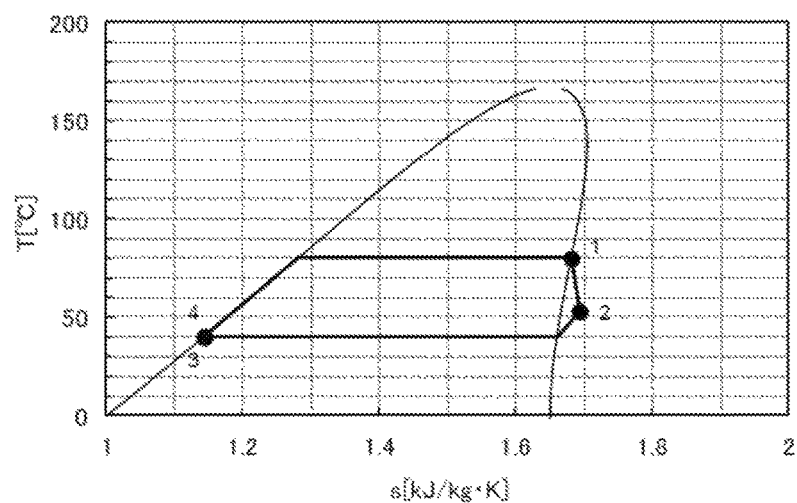
FIG. 13 is a T-s diagram of an azeotropic-like composition according to the present invention containing cis-2-chloro-1,3,3,3-tetrafluoropropene (HCFO-1224xe (Z)) and trans-1-chloro-3,3,3-trifluoropropene (HCFO-1233zd (E)).

G: Circulation quantity of the working fluid $L_{Tth}$: Theoretically generated power in the expansion device $L_T$: Generated power in the expansion device $E_G$: Generated electric energy quantity $E_P$: Required electric energy for the circulation pump $P_C$: Condenser pressure $P_E$: Evaporator pressure $L_{Pth}$: Theoretical power required for driving the circulation pump $E_{cycle}$: Effective quantity of generated electric energy $Q_E$: Input heat quantity $\eta_{cycle}$: Electric energy generation cycle efficiency $V_{2th}$: Theoretical volumetric flow rate at the exit of the expansion device $\Delta H_{th}$: Theoretical adiabatic heat drop in the expansion device SP: Expansion device size parameter $\rho$: Density of the working fluid h: Specific enthalpy 1, 2, 3, 4: Cycle point FIG. 13 is a T-s diagram in example 15 (azeotropic-like composition containing HCFO-1224xe (Z) and HCFO-1233zd (E)). In FIG. 13, cycle points 1, 2, 3 and 4 represent the organic rankine cycle system calculation conditions 4.

Comparative Example 15

2,2-dichloro-1,1,1-trifluoroethane

Figure 14:
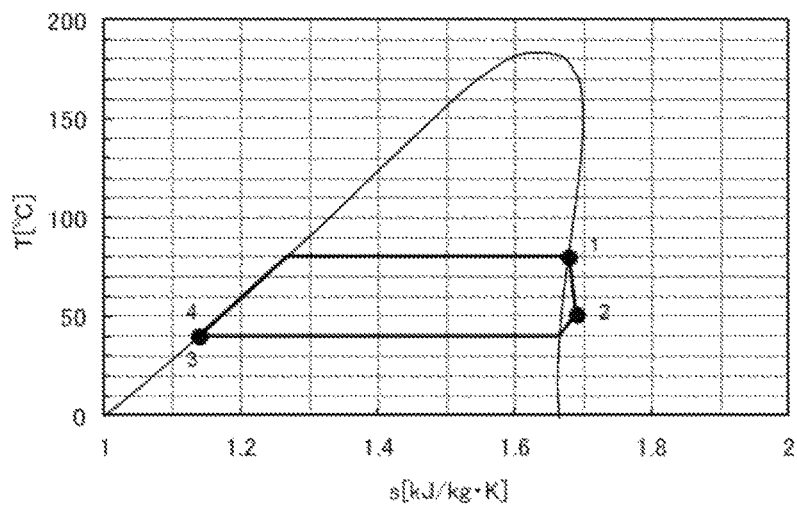
FIG. 14 is a T-s diagram of 2,2-dichloro-1,1,1-trifluoroethane (HCFC-123).

In a performance evaluation on an organic rankine cycle system conducted using 2,2-dichloro-1,1,1-trifluoroethane (HCFC-123) as the working fluid, instead of the heat transfer medium (working fluid) according to the present invention in example 15, the electric energy generation cycle efficiency and the expansion device size parameter were calculated under the conditions shown in Table 20. FIG. 14 is a T-s diagram in comparative example 15.

Table 21 shows the calculation results of the organic rankine system cycle performance ($\eta_{cycle}$ and SP) in example 15 and comparative example 15.

In Table 21, the values of a first component and a second component of the heat transfer medium (working fluid) used in example 15 are represented with mass percent. The first component of the heat transfer medium (working fluid) is cis-2-chloro-1,3,3,3-tetrafluoropropene (HCFO-1224xe (Z)), and the second component is trans-1-chloro-3,3,3-trifluoropropene (HCFO-1233zd (E)).

TABLE 21

| | | <Example 15 and Comparative example 15, calculation conditions 4> | | | | | | | | | | | | |
|---|---|---|---|---|---|---|---|---|---|---|---|---|---|---|
| WORKING FLUID | 1ST COMPONENT | 99 | 95 | 90 | 80 | 70 | 60 | 50 | 40 | 30 | 20 | 10 | 5 | 1 |
| | 2ND COMPONENT | 1 | 5 | 10 | 20 | 30 | 40 | 50 | 60 | 70 | 80 | 90 | 95 | 99 |
| EVAPORATOR PRESSURE | [kPa] | 673 | 672 | 670 | 668 | 665 | 662 | 660 | 659 | 658 | 657 | 657 | 657 | 658 |
| CONDENSER PRESSURE | [kPa] | 222 | 222 | 222 | 222 | 221 | 220 | 219 | 218 | 217 | 216 | 216 | 216 | 216 |
| PRESSURE RATIO | [—] | 3.03 | 3.02 | 3.02 | 3.01 | 3.01 | 3.02 | 3.02 | 3.03 | 3.03 | 3.04 | 3.05 | 3.05 | 3.05 |
| WETNESS FRACTION | [—] | — | — | — | — | — | — | — | — | — | — | — | — | — |
| MASS FLOW RATE | [kg/s] | 5.4 | 5.4 | 5.3 | 5.3 | 5.2 | 5.2 | 5.1 | 5 | 5 | 4.9 | 4.8 | 4.8 | 4.8 |
| VOLUMETRIC FLOW RATE AT ENTRANCE OF EXPANSION DEVICE | [m³/s] | 0.135 | 0.135 | 0.136 | 0.137 | 0.137 | 0.138 | 0.138 | 0.138 | 0.138 | 0.138 | 0.138 | 0.138 | 0.138 |
| VOLUMETRIC FLOW RATE AT EXIT OF EXPANSION DEVICE | [m³/s] | 0.418 | 0.419 | 0.419 | 0.421 | 0.423 | 0.425 | 0.426 | 0.427 | | | | | |
| PUMP POWER | [kw] | 2.2 | 2.3 | 2.3 | 2.3 | 2.3 | 2.3 | 2.3 | 2.3 | | | | | |
| WORK OF EXPANSION DEVICE | [kw] | 81.2 | 81.2 | 81.2 | 81.3 | 81.3 | 81.3 | 81.3 | 81.4 | | | | | |
| OUTPUT OF ELECTRIC ENERGY GENERATOR | [kw] | 77.2 | 77.2 | 77.2 | 77.2 | 77.2 | 77.2 | 77.3 | 77.3 | | | | | |
| NET WORK | [kw] | 74.9 | 74.6 | 74.9 | 74.9 | 74.9 | 74.9 | 75 | 75 | | | | | |
| ELECTRIC ENERGY GENERATION CYCLE EFFICIENCY | [%] | 7.90 | 7.90 | 7.90 | 7.90 | 7.90 | 7.90 | 7.90 | 7.90 | | | | | |
| SP | [m] | 0.055 | 0.055 | 0.055 | 0.055 | 0.055 | 0.055 | 0.054 | 0.054 | | | | | |

COMPARATIVE EXAMPLE 15:
- EVAPORATOR PRESSURE [kPa]: 489
- CONDENSER PRESSURE [kPa]: 154
- PRESSURE RATIO [—]: 3.17
- WETNESS FRACTION [—]: —
- MASS FLOW RATE [kg/s]: 5.3
- VOLUMETRIC FLOW RATE AT ENTRANCE OF [m³/s]: 0.182

TABLE 21-continued

| <Example 15 and Comparative example 15, calculation conditions 4> | | | | | | | |
|---|---|---|---|---|---|---|---|
| EXPANSION DEVICE VOLUMETRIC FLOW RATE AT EXIT OF EXPANSION DEVICE | [m³/s] | 0.428 | 0.428 | 0.428 | 0.428 | 0.428 | 0.576 |
| PUMP POWER | [kw] | 2.3 | 2.3 | 2.3 | 2.3 | 2.3 | 1.7 |
| WORK OF EXPANSION DEVICE | [kw] | 81.4 | 81.4 | 81.4 | 81.4 | 81.4 | 81.8 |
| OUTPUT OF ELECTRIC ENERGY GENERATOR | [kw] | 77.3 | 77.3 | 77.3 | 77.3 | 77.3 | 77.7 |
| NET WORK | [kw] | 75 | 75 | 75 | 75 | 75 | 76 |
| ELECTRIC ENERGY GENERATION CYCLE EFFICIENCY | [%] | 7.91 | 7.91 | 7.91 | 7.91 | 7.91 | 8.01 |
| SP | [m] | 0.054 | 0.054 | 0.054 | 0.054 | 0.054 | 0.064 |

Table 22 shows the relative values of the volumetric flow rate at the entrance of the expansion device, the volumetric flow rate at the exit of the expansion device, the electric energy generation cycle efficiency, and the SP value in example 15 shown in Table 21 calculated with the values of 2,2-dichloro-1,1,1-trifluoroethane in comparative example 15 being 1.

same electric energy generation cycle efficiency when being applied to the organic rankine cycle system. By contrast, the expansion device size parameter (SP) had a lower value with the heat transfer medium (working fluid) according to the present invention. This indicates that the azeotropic-like composition according to the present invention, when being used as a working fluid of an organic rankine cycle system,

TABLE 22

| <Relative values of Example 15, calculation conditions 4> | | | | | | | | | | | | | | | |
|---|---|---|---|---|---|---|---|---|---|---|---|---|---|---|---|
| WORKING FLUID | 1ST COMPONENT | 99 | 95 | 90 | 80 | 70 | 60 | 50 | 40 | 30 | 20 | 10 | 5 | 1 | COMPARATIVE EXAMPLE 15 |
| | 2ND COMPONENT | 1 | 5 | 10 | 20 | 30 | 40 | 50 | 60 | 70 | 80 | 90 | 95 | 99 | |
| VOLUMETRIC FLOW RATE AT ENTRANCE OF EXPANSION DEVICE | [—] | 0.74 | 0.74 | 0.74 | 0.75 | 0.75 | 0.76 | 0.76 | 0.76 | 0.76 | 0.76 | 0.76 | 0.76 | 0.76 | 1.00 |
| VOLUMETRIC FLOW RATE AT EXIT OF EXPANSION DEVICE | [—] | 0.73 | 0.73 | 0.73 | 0.73 | 0.73 | 0.74 | 0.74 | 0.74 | 0.74 | 0.74 | 0.74 | 0.74 | 0.74 | 1.00 |
| ELECTRIC ENERGY GENERATION CYCLE EFFICIENCY | [—] | 0.99 | 0.99 | 0.99 | 0.99 | 0.99 | 0.99 | 0.99 | 0.99 | 0.99 | 0.99 | 0.99 | 0.99 | 0.99 | 1.00 |
| SP | [—] | 0.86 | 0.86 | 0.86 | 0.86 | 0.86 | 0.85 | 0.85 | 0.85 | 0.85 | 0.85 | 0.84 | 0.84 | 0.84 | 1.00 |

The heat transfer medium (working fluid) using the azeotropic-like composition according to the present invention and 2,2-dichloro-1,1,1-trifluoroethane as a conventionally existent working fluid were compared. As shown in Table 21 and Table 22, these substances exhibited substantially the which converts thermal energy of 50° C. to 200° C. to mechanical energy (and electric energy), allows the size of the system to be decreased as compared with the working fluid of 2,2-dichloro-1,1,1-trifluoroethane, while maintaining the cycle efficiency.

Example 16

<Heat Transfer Medium Containing HCFO-1224xe (Z) and HCFO-1233zd (E)>

Figure 15:
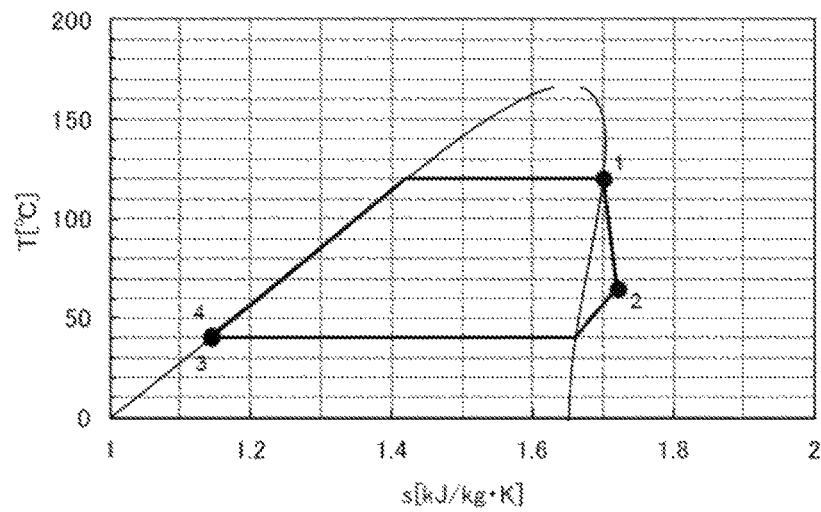
FIG. 15 is a T-s diagram of an azeotropic-like composition according to the present invention containing cis-2-chloro-1,3,3,3-tetrafluoropropene (HCFO-1224xe (Z)) and trans-1-chloro-3,3,3-trifluoropropene (HCFO-1233zd (E)).

In a performance evaluation on an organic rankine cycle system conducted using, as a heat transfer medium (working fluid), an azeotropic-like composition containing cis-2-chloro-1,3,3,3-tetrafluoropropene (HCFO-1224xe (Z)) and trans-1-chloro-3,3,3-trifluoropropene (HCFO-1233zd (E)), the electric energy generation cycle efficiency and the expansion device size parameter were calculated under the conditions shown in Table 23. FIG. 15 is a T-s diagram in example 16.

Table 23 below shows organic rankine cycle system calculation conditions 5.

TABLE 23

| ORGANIC RANKINE CYCLE SYSTEM CALCULATION CONDITIONS 5 | | | |
|---|---|---|---|
| SUPPLIED HEAT QUANTITY | $Q_{EVA}$ | 1000 | [kw] |
| EVAPORATION TEMPERATURE | $T_{EVA}$ | 120 | [° C.] |
| CONDENSATION TEMPERATURE | $T_{CON}$ | 40 | [° C.] |
| EXPANSION DEVICE EFFICIENCY | $\eta_T$ | 0.80 | [—] |
| PUMP EFFICIENCY | $\eta_P$ | 0.75 | [—] |

TABLE 23-continued

| ORGANIC RANKINE CYCLE SYSTEM CALCULATION CONDITIONS 5 | | | |
|---|---|---|---|
| ELECTRIC ENERGY GENERATOR EFFICIENCY | $\eta_G$ | 0.95 | [—] |

Comparative Example 16

2,2-dichloro-1,1,1-trifluoroethane

Figure 16:
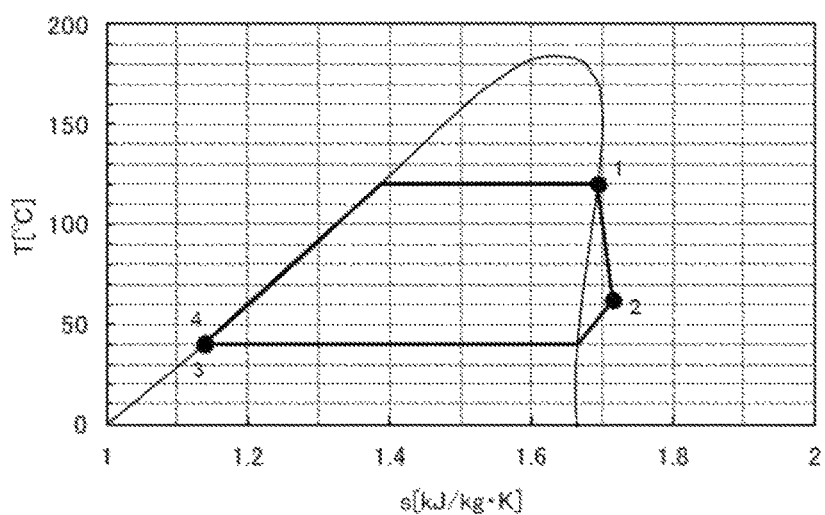
FIG. 16 is a T-s diagram of 2,2-dichloro-1,1,1-trifluoroethane (HCFC-123).

In a performance evaluation on an organic rankine cycle system conducted using 2,2-dichloro-1,1,1-trifluoroethane (HCFC-123) as the working fluid, instead of the heat transfer medium (working fluid) according to the present invention in example 16, the electric energy generation cycle efficiency and the expansion device size parameter were calculated under the conditions shown in Table 23. FIG. 16 is a T-s diagram in comparative example 16.

Table 24 shows the calculation results of the organic rankine system cycle performance ($\eta_{cycle}$ and SP) in example 16 and comparative example 16.

In Table 24, the values of a first component and a second component of the heat transfer medium (working fluid) used in example 16 are represented with mass percent. The first component of the heat transfer medium (working fluid) is cis-2-chloro-1,3,3,3-tetrafluoropropene (HCFO-1224xe (Z)), and the second component is trans-1-chloro-3,3,3-trifluoropropene (HCFO-1233zd (E)).

TABLE 24

| <Example 16 and Comparative example 16, calculation conditions 5> | | | | | | | | | |
|---|---|---|---|---|---|---|---|---|---|
| WORKING FLUID | 1ST COMPONENT | | 99 | 95 | 90 | 80 | 70 | 60 | 50 | 40 |
| | 2ND COMPONENT | | 1 | 5 | 10 | 20 | 30 | 40 | 50 | 60 |
| EVAPORATOR PRESSURE | [kPa] | 1610 | 1606 | 1601 | 1592 | 1585 | 1579 | 1575 | 1572 |
| CONDENSER PRESSURE | [kPa] | 222 | 222 | 222 | 222 | 221 | 220 | 219 | 218 |
| PRESSURE RATIO | [—] | 7.25 | 7.22 | 7.2 | 7.18 | 7.18 | 7.19 | 7.21 | 7.22 |
| WETNESS FRACTION | [—] | — | — | — | — | — | — | — | — |
| MASS FLOW RATE | [kg/s] | 4.8 | 4.8 | 4.8 | 4.8 | 4.7 | 4.7 | 4.6 | 4.6 |
| VOLUMETRIC FLOW RATE AT ENTRANCE OF EXPANSION DEVICE | [m³/s] | 0.047 | 0.047 | 0.048 | 0.048 | 0.048 | 0.049 | 0.049 | 0.049 |
| VOLUMETRIC FLOW RATE AT EXIT OF | [m³/s] | 0.392 | 0.393 | 0.394 | 0.396 | 0.398 | 0.399 | 0.401 | 0.402 |

TABLE 24-continued

<Example 16 and Comparative example 16, calculation conditions 5>

| | | | | | | | | |
|---|---|---|---|---|---|---|---|---|
| EXPANSION DEVICE PUMP POWER | [kw] | 6.2 | 6.2 | 6.3 | 6.4 | 6.4 | 6.4 | 6.4 | 6.4 |
| WORK OF EXPANSION DEVICE | [kw] | 132.1 | 132.1 | 132.2 | 132.3 | 132.5 | 132.6 | 132.7 | 132.7 |
| OUTPUT OF ELECTRIC ENERGY GENERATOR | [kw] | 125.5 | 125.5 | 125.6 | 125.7 | 125.8 | 125.9 | 126 | 126.1 |
| NET WORK | [kw] | 119.3 | 119.3 | 119.3 | 119.4 | 119.4 | 119.5 | 119.6 | 119.7 |
| ELECTRIC ENERGY GENERATION CYCLE EFFICIENCY | [%] | 12.6 | 123.6 | 12.6 | 12.6 | 12.61 | 12.6 | 12.6 | 12.6 |
| SP | [m] | 0.045 | 0.045 | 0.045 | 0.045 | 0.045 | 0.045 | 0.045 | 0.045 |

| | | | | | | | | |
|---|---|---|---|---|---|---|---|---|
| WORKING FLUID | 1ST COMPONENT | | 30 | 20 | 10 | 5 | 1 | COMPARATIVE EXAMPLE 16 |
| | 2ND COMPONENT | | 70 | 80 | 90 | 95 | 99 | |
| EVAPORATOR PRESSURE | [kPa] | | 1571 | 1571 | 1572 | 1574 | 1575 | 1199 |
| CONDENSER PRESSURE | [kPa] | | 217 | 216 | 216 | 216 | 216 | 155 |
| PRESSURE RATIO | [—] | | 7.24 | 7.27 | 7.29 | 7.3 | 7.31 | 7.8 |
| WETNESS FRACTION | [—] | | — | — | — | — | — | — |
| MASS FLOW RATE | [kg/s] | | 4.5 | 4.5 | 4.4 | 4.4 | 4.4 | 4.8 |
| VOLUMETRIC FLOW RATE AT ENTRANCE OF EXPANSION DEVICE | [m³/s] | | 0.049 | 0.049 | 0.049 | 0.049 | 0.049 | 0.065 |
| VOLUMETRIC FLOW RATE AT EXIT OF EXPANSION DEVICE | [m³/s] | | 0.403 | 0.404 | 0.404 | 0.404 | 0.404 | 0.542 |
| PUMP POWER | [kw] | | 6.4 | 6.4 | 6.5 | 6.5 | 6.5 | 4.7 |
| WORK OF EXPANSION DEVICE | [kw] | | 132.8 | 132.9 | 132.9 | 132.9 | 132.9 | 134.4 |
| OUTPUT OF ELECTRIC ENERGY GENERATOR | [kw] | | 126.2 | 126.2 | 126.3 | 126.3 | 126.3 | 127.6 |
| NET WORK | [kw] | | 119.7 | 119.8 | 119.8 | 119.8 | 119.8 | 122.9 |
| ELECTRIC ENERGY GENERATION CYCLE EFFICIENCY | [%] | | 123.6 | 12.6 | 12.6 | 12.61 | 12.6 | 13.0 |
| SP | [m] | | 0.045 | 0.045 | 0.045 | 0.045 | 0.045 | 0.053 |

Table 25 shows the relative values of the volumetric flow rate at the entrance of the expansion device, the volumetric flow rate at the exit of the expansion device, the electric energy generation cycle efficiency, and the SP value in example 16 shown in Table 24 calculated with the values of 2,2-dichloro-1,1,1-trifluoroethane in comparative example 16 being 1.

azeotropic-like composition according to the present invention, a washing detergent, a solvent, a silicone solvent, a foaming agent, a coolant, a heating medium for a heat pump, and a high temperature working fluid that are non-flammable or slightly flammable, have little influence on the environment, and have substantially the same composition ratio in a liquid phase and a gas phase thereof may be provided.

TABLE 25

<Relative values of Example 16, calculation conditions 5>

| WORKING FLUID | 1ST COMPONENT | 99 | 95 | 90 | 80 | 70 | 60 | 50 | 40 | 30 | 20 | 10 | 5 | 1 | COMPARATIVE EXAMPLE 16 |
|---|---|---|---|---|---|---|---|---|---|---|---|---|---|---|---|
| | 2ND COMPONENT | 1 | 5 | 10 | 20 | 30 | 40 | 50 | 60 | 70 | 80 | 90 | 95 | 99 | |
| VOLUMETRIC FLOW RATE AT ENTRANCE OF EXPANSION DEVICE | [—] | 0.72 | 0.72 | 0.72 | 0.73 | 0.73 | 0.74 | 0.74 | 0.75 | 0.75 | 0.75 | 0.75 | 0.75 | 0.75 | 1.00 |
| VOLUMETRIC FLOW RATE AT EXIT OF EXPANSION DEVICE | [—] | 0.72 | 0.72 | 0.73 | 0.73 | 0.73 | 0.73 | 0.74 | 0.74 | 0.74 | 0.74 | 0.751 | 0.75 | 0.75 | 1.00 |
| ELECTRIC ENERGY GENERATION CYCLE EFFICIENCY | [—] | 0.97 | 0.97 | 0.97 | 0.97 | 0.97 | 0.97 | 0.97 | 0.97 | 0.97 | 0.98 | 0.98 | 0.98 | 0.98 | 1.00 |
| SP | [—] | 0.86 | 0.86 | 0.86 | 0.86 | 0.86 | 0.86 | 0.86 | 0.85 | 0.85 | 0.85 | 0.85 | 0.85 | 0.85 | 1.00 |

The heat transfer medium (working fluid) using the azeotropic-like composition according to the present invention and 2,2-dichloro-1,1,1-trifluoroethane as a conventionally existent working fluid were compared. As shown in Table 24 and Table 25, these substances exhibited substantially the same electric energy generation cycle efficiency when being applied to the organic rankine cycle system. By contrast, the expansion device size parameter (SP) had a lower value with the heat transfer medium (working fluid) according to the present invention. This indicates that the azeotropic-like composition according to the present invention, when being used as a working fluid of an organic rankine cycle system, which converts thermal energy of 50° C. to 200° C. to mechanical energy (and electric energy), allows the size of the system to be decreased as compared with the working fluid of 2,2-dichloro-1,1,1-trifluoroethane, while maintaining the cycle efficiency.

From the results of examples 12 through 16, it is seen that an azeotropic-like composition according to the present invention containing 2-chloro-1,3,3,3-tetrafluoropropene (HCFO-1224xe) and 1-chloro-3,3,3-trifluoropropene (HCFO-1233zd) is useful as a heat transfer medium used in a heat transfer device such as a refrigeration cycle system, a high temperature heat pump cycle system, an organic rankine cycle system or the like.

The present invention relates to an azeotropic-like composition containing 2-chloro-1,3,3,3-tetrafluoropropene (HCFO-1224xe) and 1-chloro-3,3,3-trifluoropropene (HCFO-1233zd), which is useful in many uses. By use of an

What is claimed is:

1. An azeotropic-like composition consisting essentially of 2 chloro-1,3,3,3-tetrafluoropropene and 1-chloro-3,3,3-trifluoropropene.

2. The azeotropic-like composition according to claim 1, wherein the azeotropic-like composition has trans-2-chloro-1,3,3,3-tetrafluoropropene and trans-1-chloro-3,3,3-trifluoropropene.

3. The azeotropic-like composition according to claim 2, wherein the trans-1-chloro-3,3,3-trifluoropropene is contained at a content of 1 mol % or greater and 99.999 mol % or less, and the trans-2-chloro-1,3,3,3-tetrafluoropropene is contained at a content of 0.001 mol % or greater and 99 mol % or less.

4. The azeotropic-like composition according to claim 1, wherein the azeotropic-like composition has cis-2-chloro-1,3,3,3-tetrafluoropropene and trans-1-chloro-3,3,3-trifluoropropene.

5. The azeotropic-like composition according to claim 4, wherein the cis-2-chloro-1,3,3,3-tetrafluoropropene is contained at a content of 0.001 mol % or greater and 99.999 mol % or less, and the trans-1-chloro-3,3,3-trifluoropropene is contained at a content of 0.001 mol % or greater and 99.999 mol % or less.

6. The azeotropic-like composition according to claim 1, wherein the azeotropic-like composition has trans-2-chloro-1,3,3,3-tetrafluoropropene and cis-1-chloro-3,3,3-trifluoropropene.

7. The azeotropic-like composition according to claim 6, wherein the trans-2-chloro-1,3,3,3-tetrafluoropropene is contained at a content of 90 mol % or greater and 99.9 mol % or less, and the cis-1-chloro-3,3,3-trifluoropropene is contained at a content of 0.1 mol % or greater and 10 mol % or less.

8. The azeotropic-like composition according to claim 1, wherein the azeotropic-like composition has trans-2-chloro-1,3,3,3-tetrafluoropropene, cis-2-chloro-1,3,3,3-tetrafluoropropene and trans-1-chloro-3,3,3-trifluoropropene.

9. The azeotropic-like composition according to claim 1, wherein the azeotropic-like composition has trans-2-chloro-1,3,3,3-tetrafluoropropene, cis-2-chloro-1,3,3,3-tetrafluoropropene, trans-1-chloro-3,3,3-trifluoropropene, and cis-1-chloro-3,3,3-trifluoropropene.

10. A washing detergent comprising the azeotropic-like composition according to claim 1.

11. A solvent comprising the azeotropic-like composition according to claim 1.

12. A silicone solvent comprising the azeotropic-like composition according to claim 1.

13. A foaming agent comprising the azeotropic-like composition according to claim 1.

14. A heat transfer medium comprising the azeotropic-like composition according to claim 1.

15. A heat transfer device using the heat transfer medium according to claim 14.

16. An organic rankine cycle system using the heat transfer medium according to claim 14.

17. A high temperature heat pump cycle system using the heat transfer medium according to claim 14.

18. A refrigeration cycle system using the heat transfer medium according to claim 14.

19. The azeotropic-like composition according to claim 1, wherein the azeotropic-like composition consists of 2-chloro-1,3,3,3-tetrafluoropropene and 1-chloro-3,3,3-trifluoropropene.

20. The washing detergent according to claim 10 further comprising a surfactant.

21. The heat transfer medium according to claim 14 further comprising a lubricant, a stabilizer or a flame retardant.

22. A washing detergent comprising the azeotropic-like composition according to claim 19.

23. A heat transfer medium comprising the azeotropic-like composition according to claim 19.

24. The washing detergent according to claim 22 further comprising a surfactant.

25. The heat transfer medium according to claim 23 further comprising a lubricant, a stabilizer or a flame retardant.

* * * * *